United States Patent
Fukase

(10) Patent No.: US 10,547,752 B2
(45) Date of Patent: Jan. 28, 2020

(54) IMAGE INSPECTION DEVICE, IMAGE INSPECTION SYSTEM, AND IMAGE INSPECTION METHOD

(71) Applicant: Ricoh Company, Ltd., Ohta-ku, Tokyo (JP)

(72) Inventor: Takahiro Fukase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/174,840

(22) Filed: Oct. 30, 2018

(65) Prior Publication Data
US 2019/0132454 A1    May 2, 2019

(30) Foreign Application Priority Data

Nov. 1, 2017 (JP) .................................. 2017-212261

(51) Int. Cl.
*H04N 1/00* (2006.01)

(52) U.S. Cl.
CPC ..... *H04N 1/00045* (2013.01); *H04N 1/00082* (2013.01); *H04N 1/00092* (2013.01)

(58) Field of Classification Search
None
See application file for complete search history.

(56) References Cited

U.S. PATENT DOCUMENTS

| 8,655,068 | B1* | 2/2014 | Li | H04N 1/60 |
| | | | | 382/128 |
| 2014/0268260 | A1 | 9/2014 | Kitai et al. | |
| 2014/0314281 | A1 | 10/2014 | Kojima et al. | |
| 2016/0031248 | A1* | 2/2016 | Ikegami | G06K 15/027 |
| | | | | 347/19 |

FOREIGN PATENT DOCUMENTS

| JP | 2005-223515 | 8/2005 |
| JP | 2011-156861 | 8/2011 |
| JP | 2014-074711 | 4/2014 |
| JP | 2014-127902 | 7/2014 |
| JP | 2014-134401 | 7/2014 |
| JP | 2014-199646 | 10/2014 |
| JP | 2017-032864 | 2/2017 |

* cited by examiner

*Primary Examiner* — Lennin R Rodriguezgonzalez
(74) *Attorney, Agent, or Firm* — Harness, Dickey and Pierce, P.L.C.

(57) ABSTRACT

An image inspection device includes a reading device and a processor. The reading device is configured to read a chart image on a recording medium to generate a first read image. The reading device is configured to read an image to be inspected on a recording medium to generate a second read image. The processor is configured to calculate a plurality of types of correction parameters on basis of the first read image and image data of the chart image, correct the image data with the plurality of types of correction parameters to generate a reference image, and compare the reference image and the second read image to inspect the second read image.

12 Claims, 24 Drawing Sheets

| PAPER NAME | CORRECTION PARAMETER | | | | | | PAPER CHARACTERISTIC INFORMATION |
| --- | --- | --- | --- | --- | --- | --- | --- |
| | MAIN-SCANNING DIRECTION MAGNIFICATION | SUB-SCANNING DIRECTION MAGNIFICATION | MAIN-SCANNING DIRECTION PARALLEL MOVEMENT AMOUNT | SUB-SCANNING DIRECTION PARALLEL MOVEMENT AMOUNT | SKEW AMOUNT | TRIMMING WIDTH | COLOR CONVERSION LUT FILE NAME | ... |
| PLAIN PAPER A4 LEF | 1.0005 | 1.0003 | 0.5 mm | 1.6 mm | 3 DEGREES | 8 mm | plain_a4_lef.dat | ... |
| GLOSSY PAPER A3 SEF | 0.9997 | 1.0012 | 0.4 mm | 2.0 mm | 5 DEGREES | 10 mm | gross_a3_sef.dat | ... |
| ... | ... | ... | ... | ... | ... | ... | ... | ... |

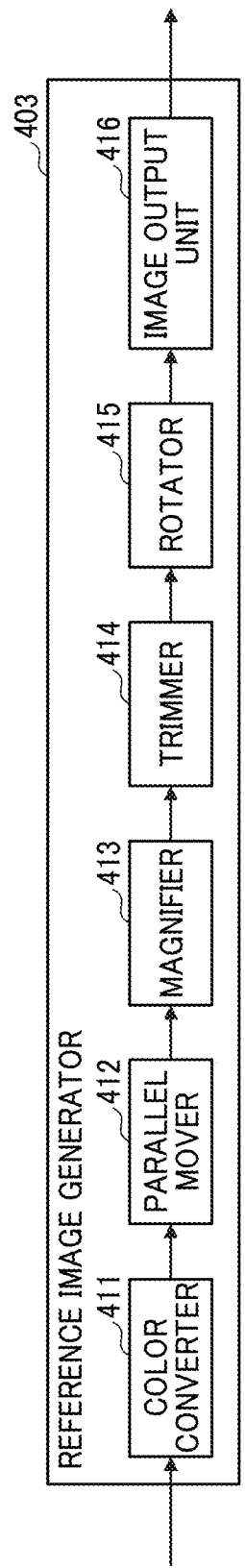

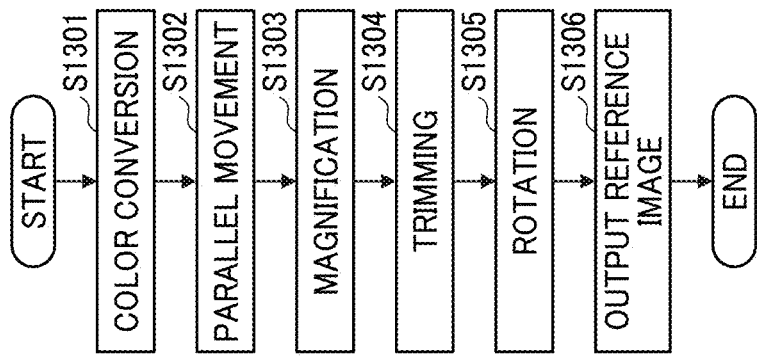
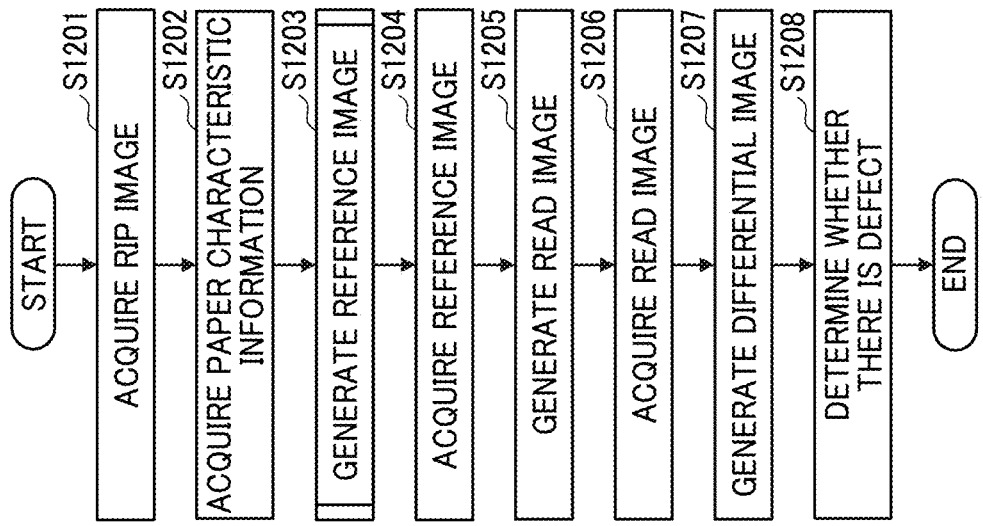
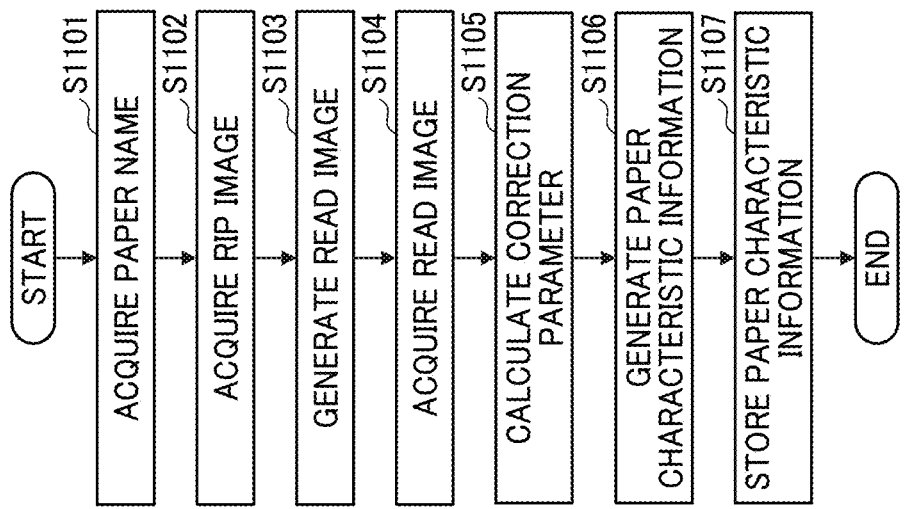

FIG. 14
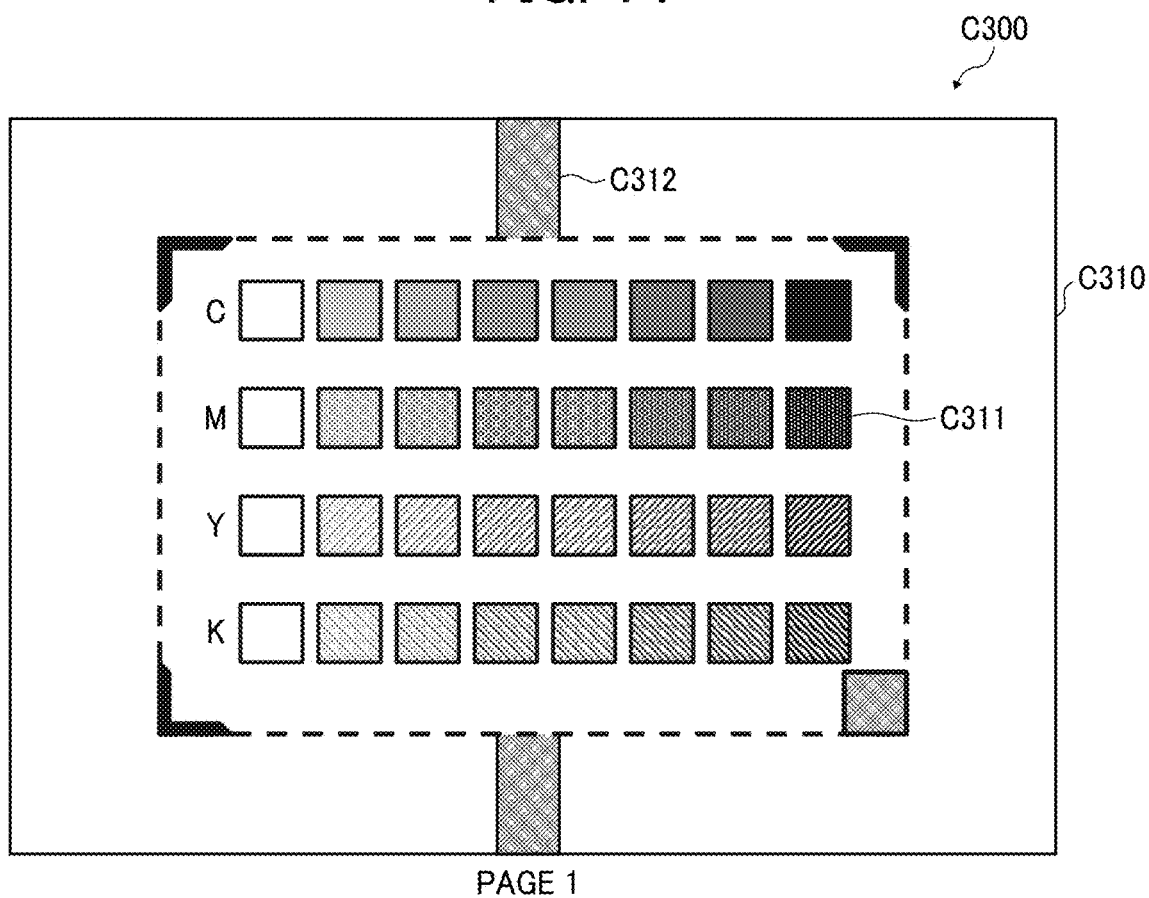
PAGE 1
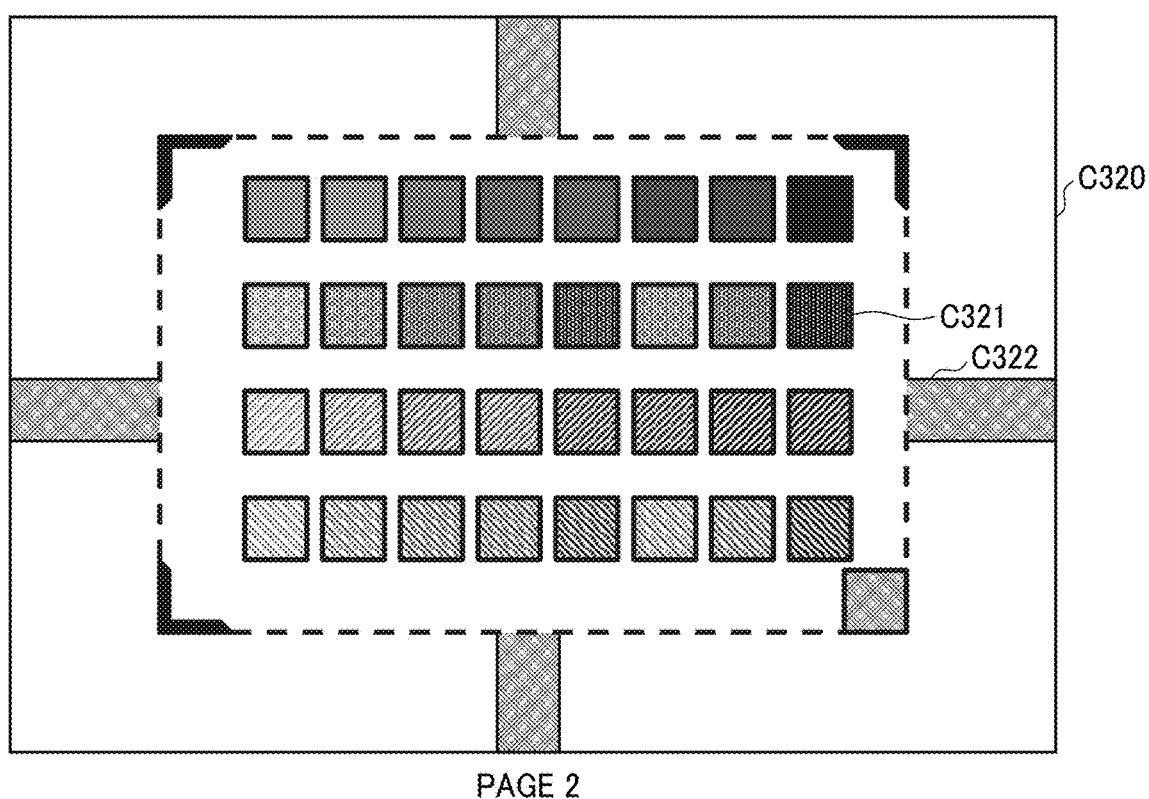
PAGE 2

RIP IMAGE

READ IMAGE

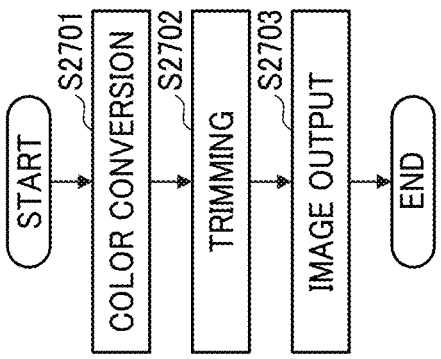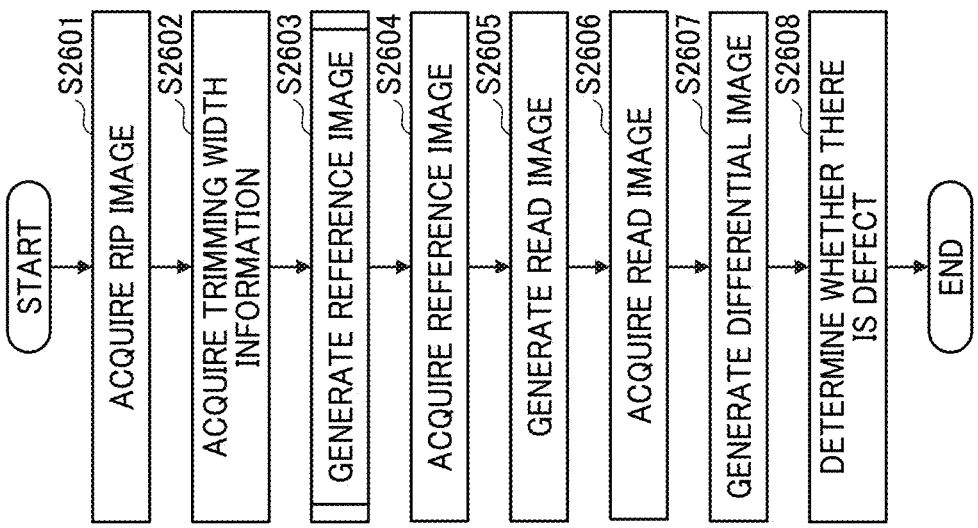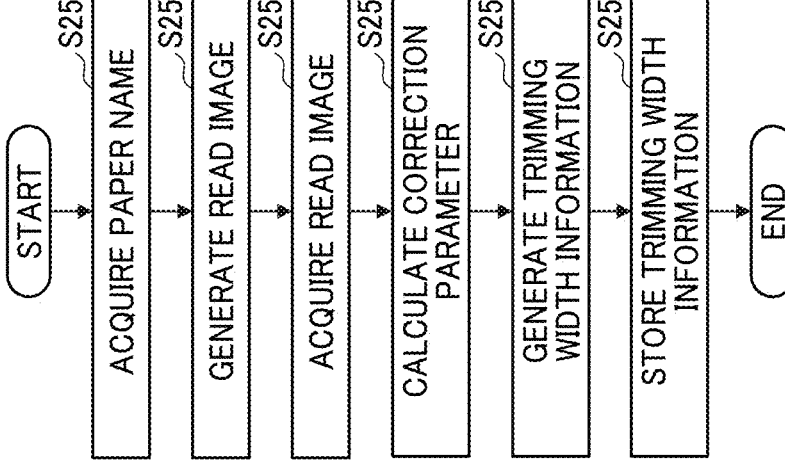

IMAGE INSPECTION DEVICE, IMAGE INSPECTION SYSTEM, AND IMAGE INSPECTION METHOD

CROSS-REFERENCE TO RELATED APPLICATION

This patent application is based on and claims priority pursuant to 35 U.S.C. § 119(a) to Japanese Patent Application No. 2017-212261, filed on Nov. 1, 2017, in the Japan Patent Office, the entire disclosure of which is hereby incorporated by reference herein.

BACKGROUND

Technical Field

Embodiments of the present disclosure relate to an image inspection device, an image inspection system, and an image inspection method.

Description of the Related Art

In production printing, the quality of printed matter output by a printing device is inspected. As such an inspection method, for example, there is known a method for comparing a reference image obtained by reading a printed matter serving as a reference of quality with a scanner or other devices and an inspected image obtained by reading a printed matter to be inspected with a scanner or other devices.

Here, in a printing mode called print on demand, there are cases where the contents to be printed are different for every page unlike in a printing form such as offset printing. It is therefore difficult to obtain a reference image by reading a printed matter serving as a reference of quality with a scanner or other devices. Therefore, it is conceivable to use a document image as a reference image.

In a case where a document image is used as a reference image, there are cases where the reference image and an inspected image cannot be directly compared due to a difference in colors or the shape attributable to a printing process, a paper, etc., noise, or other reasons. Meanwhile, there is technology to calculate a correction parameter using a predetermined chart.

SUMMARY

According to an aspect of the present disclosure, an image inspection device includes a reading device and a processor. The reading device is configured to read a chart image on a recording medium to generate a first read image. The reading device is configured to read an image to be inspected on a recording medium to generate a second read image. The processor is configured to calculate a plurality of types of correction parameters on basis of the first read image and image data of the chart image, correct the image data with the plurality of types of correction parameters to generate a reference image, and compare the reference image and the second read image to inspect the second read image.

According to another aspect of the present disclosure, an image inspection system includes a reading device and a processor. The reading device is configured to read a chart image on a recording medium to generate a first read image. The reading device is configured to read an image to be inspected on a recording medium to generate a second read image. The processor is configured to calculate a plurality of types of correction parameters on basis of the first read image and image data of the chart image, correct the image data with the plurality of types of correction parameters to generate a reference image, and compare the reference image and the second read image to inspect the second read image.

According to still another aspect of the present disclosure, an image inspection method includes reading a chart image on a recording medium to generate a first read image, calculating a plurality of types of correction parameters on basis of the first read image and image data of the chart image, reading an image to be inspected on a recording medium to generate a second read image, correcting the image data with the plurality of types of correction parameters to generate a reference image, and comparing the reference image and the second read image to inspect the second read image.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9 is a table illustrating an example of paper characteristic information;

FIG. 10 is a diagram illustrating an example of a detailed functional configuration of a reference image generator according to the first embodiment;

FIG. 11 is a flowchart illustrating an example of generation processing of paper characteristic information according to the first embodiment;

FIG. 12 is a flowchart illustrating an example of image inspection processing according to the first embodiment;

FIG. 13 is a flowchart illustrating an example of generation processing of a reference image according to the first embodiment;

FIG. 14 is a diagram illustrating another example (part 1) of the integrated chart for calculation of the correction parameter;

FIG. 25 is a flowchart illustrating an example of generation processing of trimming width information according to the second embodiment;

FIG. 26 is a flowchart illustrating an example of image inspection processing according to the second embodiment;

FIG. 27 is a flowchart illustrating an example of generation processing of a reference image according to the second embodiment;

Figure 1:
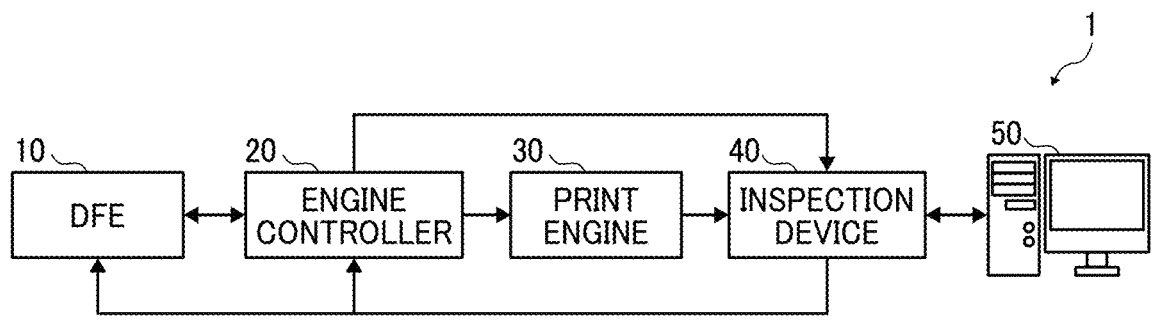
FIG. 1 is a diagram illustrating an example of the general arrangement of an image forming system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present invention will be described in detail with reference to the drawings.

First Embodiment

<General Arrangement of Image Forming System 1>

First, the general arrangement of an image forming system 1 according to the present embodiment will be described with reference to FIG. 1. FIG. 1 is a diagram illustrating an example of the general arrangement of an image forming system 1 according to the present embodiment.

As illustrated in FIG. 1, an image forming system 1 according to the present embodiment includes a digital front end (DFE) 10, an engine controller 20, a print engine 30, an inspection device 40, and a user terminal 50.

The DFE 10 is an image processing device that performs raster image processor (RIP) processing based on a received print job to generate image data to be printed (that is, bitmap data) and outputs the generated image data to the engine controller 20. Hereinafter, the bitmap data generated by the DFE 10 is also referred to as an "RIP image."

On the basis of the RIP image received from the DFE 10, the engine controller 20 controls the print engine 30 to execute image formation output. The engine controller 20 further transmits the RIP image received from the DFE 10 to the inspection device 40.

The print engine 30 is an image forming device that executes image formation output to a paper as a recording medium based on the RIP image under the control of the engine controller 20. Note that, as a recording medium, a sheet-shaped material such as a film and plastic can be adopted in addition to the aforementioned paper as long as the material can be an object of image formation output.

Based on the RIP image received from the engine controller 20, the inspection device 40 generates an image (reference image) that serves as a reference for inspecting the result of the image formation output by the print engine 30. The inspection device 40 further generates a read image by reading a printing paper which is the result of the image formation output by the print engine 30. Then, the inspection device 40 compares the reference image and the read image to inspect the result of the image formation output by the print engine 30.

Note that in a case where the inspection device 40 determines that there is a defect in the result of the image formation output by the print engine 30, the inspection device 40 notifies the engine controller 20 of information related to a page determined to be defective. As a result, the engine controller 20 executes reprint control of the page determined to be defective.

However, it is not necessary to reprint the page determined to be defective. For example, the information related to the page determined to be defective may be displayed on the user terminal 50. Alternatively, the engine controller 20, the inspection device 40, or other components may hold the information related to the page determined to be defective.

The user terminal 50 is an information processing terminal to allow a user to designate a parameter used for inspection and to allow the user to confirm an inspection result by the inspection device 40, for example.

<Hardware Configuration of Inspection Device 40>

Figure 2:
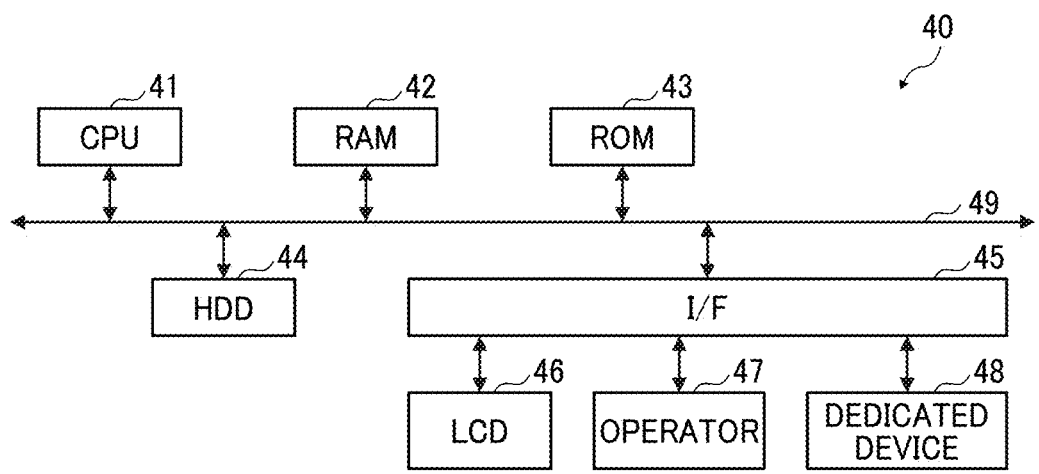
FIG. 2 is a diagram illustrating an example of a hardware configuration of an inspection device according to the first embodiment.

Next, a hardware configuration of the inspection device 40 according to the present embodiment will be described with reference to FIG. 2. FIG. 2 is a diagram illustrating an example of the hardware configuration of the inspection device 40 according to the present embodiment.

As illustrated in FIG. 2, the inspection device 40 according to the present embodiment has a hardware configuration similar to hardware configurations of information processing devices such as a general personal computer (PC) or a server. That is, the inspection device 40 according to the present embodiment includes a central processing unit (CPU) 41, a random access memory (RAM) 42, a read only memory (ROM) 43, a hard disk drive (HDD) 44, and an interface (I/F) 45. These are connected via a bus 49.

The I/F 45 is further connected with a liquid crystal display (LCD) 46, an operator 47, and a dedicated device 48.

The CPU 41 is an arithmetic device that reads programs or data from a storage device such as the ROM 43 and the HDD 44 onto the RAM 42 and executes processing to implement the control or implement functions of the entire inspection device 40. The RAM 42 is a volatile semiconductor memory that temporarily holds programs or data. The ROM 43 is a nonvolatile semiconductor memory capable of holding programs or data even when the power is turned off.

The HDD 44 is a nonvolatile storage device that stores programs or data. Programs and data stored in the HDD 44 include an operating system (OS) which is basic software for controlling the entire inspection device 40, application software which provides various functions on the OS, and other data.

Note that the inspection device 40 may have a drive device (for example, a solid state drive (SSD)) that uses a flash memory as a storage medium instead of or in addition to the HDD 44.

The I/F 45 is an interface for connecting the bus 49 and various types of hardware and networks. The LCD 46 is a user interface for allowing the user to confirm processing results and the like of the inspection device 40. The operator 47 is a user interface for allowing the user to input various types of information to the inspection device 40, such as a keyboard and a mouse.

The dedicated device 48 is hardware for implementing a dedicated function. The dedicated device 48 may include an arithmetic device such as an application specific integrated circuit (ASIC) for performing image processing at a high speed, a reading device that reads an image output on a paper surface, and other devices.

The inspection device 40 according to the present embodiment having the hardware configuration illustrated in FIG. 2 is capable of implementing various types of processing which will be described later.

<Mechanical Structure of Print Engine 30 and Inspection Device 40 and Paper Conveyance Path>

Figure 3:
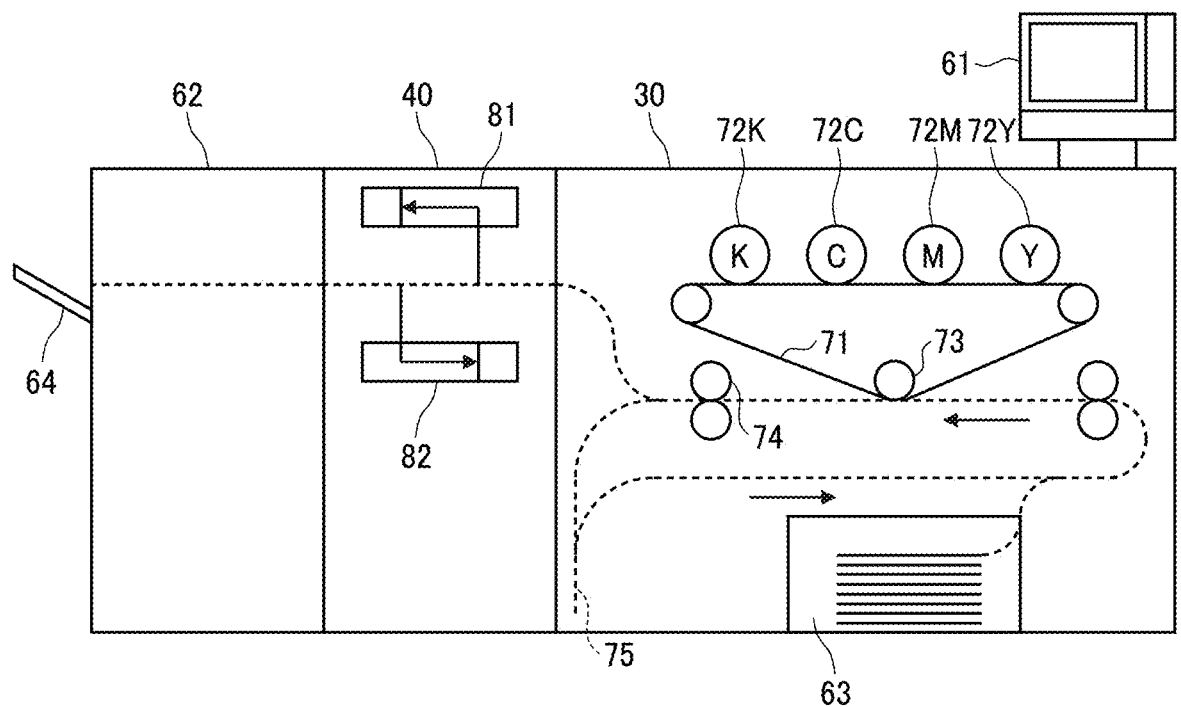
FIG. 3 is a diagram illustrating an example of a mechanical configuration and a paper conveyance path of a print engine and the inspection device according to the first embodiment.

Next, a mechanical configuration and a paper conveyance path of the print engine 30 and the inspection device 40 according to the first embodiment will be described with reference to FIG. 3. FIG. 3 is a diagram illustrating an example of a mechanical configuration and a paper conveyance path of the print engine 30 and the inspection device 40 according to the present embodiment.

As illustrated in FIG. 3, the print engine 30 according to the present embodiment is connected with an operating device 61 that provides a user interface. In the print engine 30, photoconductor drums 72Y, 72M, 72C, and 72K of respective colors (hereinafter referred to as "photoconductor drums 72" when the colors are not distinguished) are arranged along a conveyance belt 71. That is, along the conveyance belt 71, which is an intermediate transfer belt on which an intermediate transfer image to be transferred to a paper (an example of a recording medium) fed from a paper feed tray 63 is formed, the photoconductor drums 72Y to 72K are arranged in this order from the upstream side in the conveyance direction of the conveyance belt 71.

Images of respective colors developed by the toners on surfaces of the photoconductor drums 72 of the respective colors are superimposed on the conveyance belt 71 and thereby transferred to form a full-color image. The full-color image formed on the conveyance belt 71 is transferred onto a surface of a paper conveyed on the conveyance path indicated by a broken line in the figure by a function of a transfer roller 73.

The paper with the image formed on the paper surface is further conveyed and, after the image is fixed by the fixing roller 74, conveyed to the inspection device 40. In the case of duplex printing, a paper with an image formed and fixed on one side of the paper is conveyed to a reversing path 75 to be reversed and then again conveyed to a transfer position by the transfer roller 73.

A reading device 81 reads a surface of a paper in a conveyance path inside the inspection device 40 and generates a read image. In the case of duplex printing, both sides of a paper are read by the reading device 81 and a reading device 82, and a read image is generated.

Then, the paper the surface of which has been read is further conveyed inside the inspection device 40 and conveyed to a stacker 62. Thereafter, the paper conveyed to the stacker 62 is discharged to a paper ejection tray 64.

<Comparison Between Reference Image and Read Image>

As described above, the inspection device 40 according to the present embodiment compares a reference image and a read image to inspect a result of the image formation output by the print engine 30.

Here, the RIP image is represented in, for example, four colors of cyan, magenta, yellow, and black (CMYK). An image size and the like are rendered according to the setting of a print job. Meanwhile, a read image is represented by, for example, red, green, and blue (RGB). In addition, since a chromogenic property of a read image varies depending on a paper, even when colors on the RIP image are the same, the colors may be different with different types of paper. Furthermore, a change in the shape such as parallel movement, magnification, or skew occurs due to various factors such as pressurization/heating and a fluctuation in the transfer position in the print engine 30 when the RIP image is printed on a paper. Such changes in the shape are disadvantageously reflected on the read image as well.

Figure 4B:
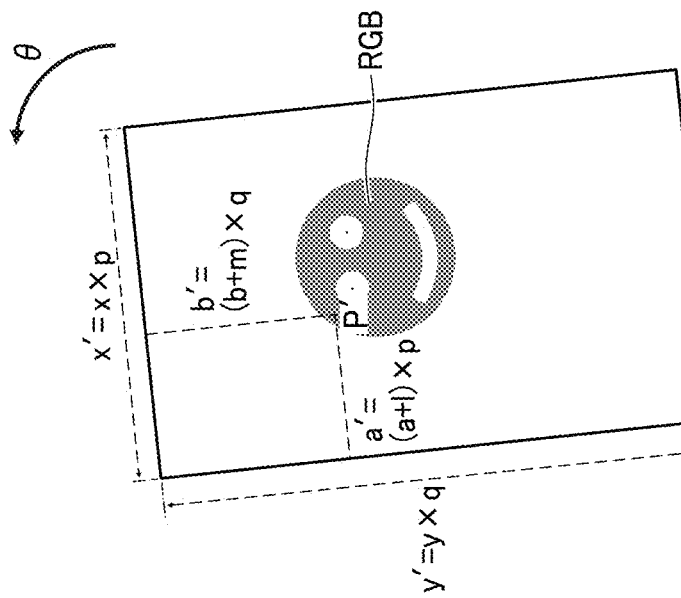
FIGS. 4A and 4B are diagrams for explaining an example where an RIP image and a read image according to the first embodiment cannot be directly compared.
Figure 4A:
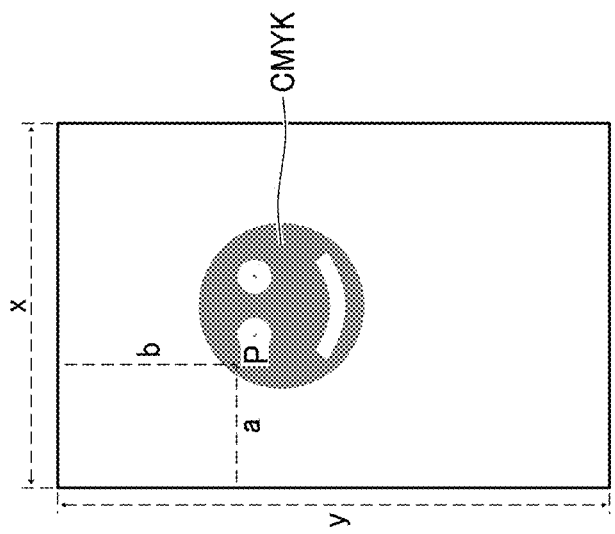

For example, as illustrated in FIG. 4A, let us assume that the RIP image is represented in four colors of CMYK and that the image size is x×y. As illustrated in FIG. 4B, a read image generated by reading a paper on which this RIP image is printed is represented in three colors of RGB while parallel movement (m, l), magnification (p, q), and skew ($\theta$) are reflected as illustrated in FIG. 4B. In this case, for example, a point P (a, b) on the RIP image corresponds to a point P' (a', b') on the read image.

Therefore, comparison between the reference image and the read image with the RIP image serving as the reference image does not allow a result of image formation output by the print engine 30 to be inspected. Therefore, the inspection device 40 according to the present embodiment compares a reference image, generated by correcting an RIP image with a correction parameter calculated from a chart, and a read image to inspect a result of image formation output by the print engine 30. The correction parameter can be calculated from an RIP image and a read image obtained by printing a dedicated chart. Note that a trimming amount can be calculated only from a read image.

<Chart for Calculation of Correction Parameter>

Here, a chart for calculation of correction parameters will be described. Various charts illustrated in FIGS. 5A to 5C are known in the related art as charts for calculation of correction parameters.

Figure 5A:
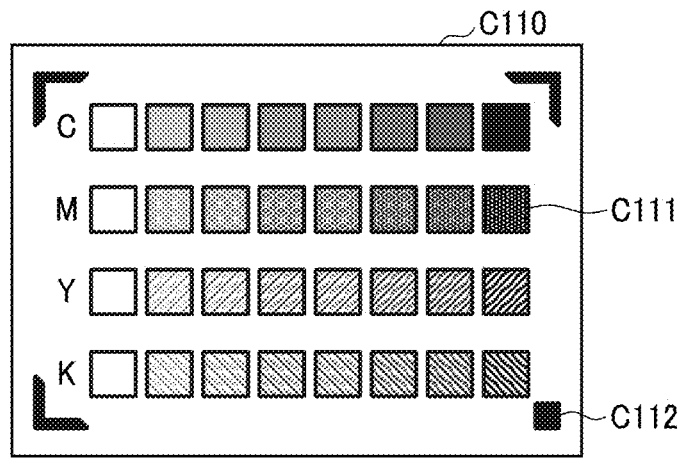
FIGS. 5A to 5C are diagrams illustrating an example of various charts for calculation of a correction parameter.

In a color chart C110 illustrated in FIG. 5A, color patches C111 and a position grasping marker C112 are arranged.

In the color chart C110, eight stages of color patches C111 are arranged from 0% to 100% in density for the respective colors of CMYK. The color patches C111 enables calculation of a correction parameter for correcting a chromogenic property of a paper. That is, by performing colorimetry of the color patches C111 on each of an RIP image of the color chart C110 and a read image and correlating the colorimetric values of the same color patch, a correction parameter for correcting the chromogenic property can be calculated. Note that rotation of an image can be grasped by the position grasping marker C112 arranged in the color chart C110.

Figure 5B:
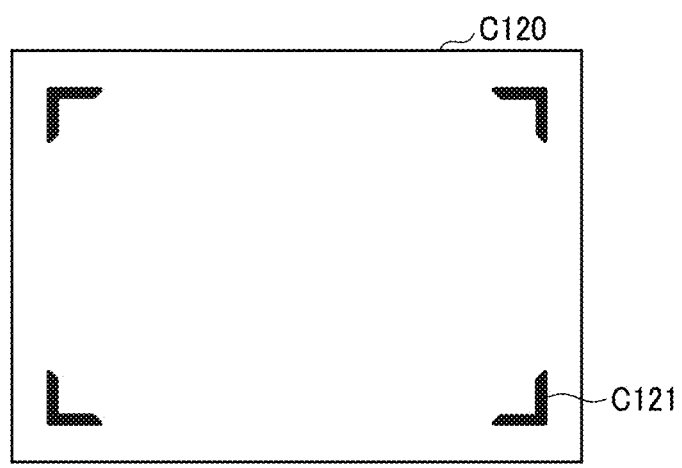
Figure 5C:
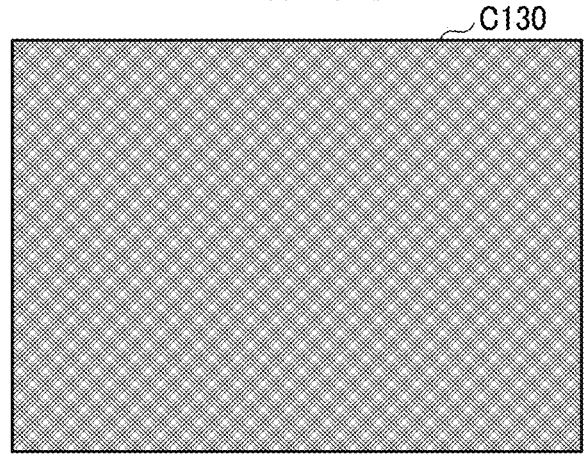

In a shape chart C120 illustrated in FIG. 5B, shape grasping markers C121 are arranged. A rendering color of the shape grasping markers C121 is a color having a sufficiently large difference from the color of the paper.

The shape grasping markers C121 enable calculation of correction parameters for correcting shape characteristics such as expansion/shrinkage (magnification), a positional variation (parallel movement), or rotation (skew). That is, a correction parameter for correcting a magnification can be calculated from a change in the distance among the shape grasping markers C121 in each of an RIP image of the shape chart C120 and a read image. For example, a correction parameter for correcting the magnification can be calculated from a change in the distance between the upper left shape grasping marker C121 and the upper right shape grasping marker C121 and a change in the distance between the upper left shape grasping marker C121 and the lower left shape grasping marker C121.

Furthermore, a correction parameter for correcting parallel movement can be calculated from the amount of positional displacement between a shape grasping marker C121 of the RIP image of the shape chart C120 and a corresponding shape grasping marker C121 of the read image. For example, a correction parameter for correcting parallel movement can be calculated from the amount of positional displacement between an upper left shape grasping marker C121 in the RIP image and an upper left shape grasping marker C121 in the read image.

Furthermore, a correction parameter for correcting skew can be calculated from a rotation angle of the whole shape grasping markers C121 between the RIP image of the shape chart C120 and the read image.

Figure 6A:
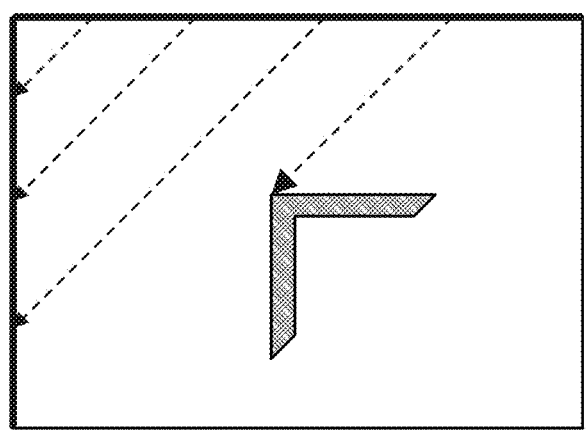
FIGS. 6A and 6B are diagrams for explaining an example of a method for calculating the correction parameter.

In order to calculate a correction parameter from the shape chart C120, it is necessary to specify the position of the shape grasping markers C121 in the read image. In order to specify the position of a shape grasping marker C121, for example, as illustrated in FIG. 6A, it is sufficient to search a pixel along a skewed line at an angle of 45 degrees starting from a corner (apex) of the read image. When the left side of the image is hit without finding the shape grasping marker C121, it is sufficient to repeat similar search by shifting the starting point to the right by one pixel. The shape grasping marker C121 can be specified by using the fact that a change in a pixel value in the search direction is small since the color is a paper color if the shape grasping marker C121 is not present and that a pixel value significantly changes from the paper color when a corner of the shape grasping marker C121 is hit.

A trim chart C130 illustrated in FIG. 5C is entirely painted in order to specify the upper, lower, left, and right deletion widths (trimming widths). As a result, correction parameters for correcting trimming widths can be calculated.

Figure 6B:
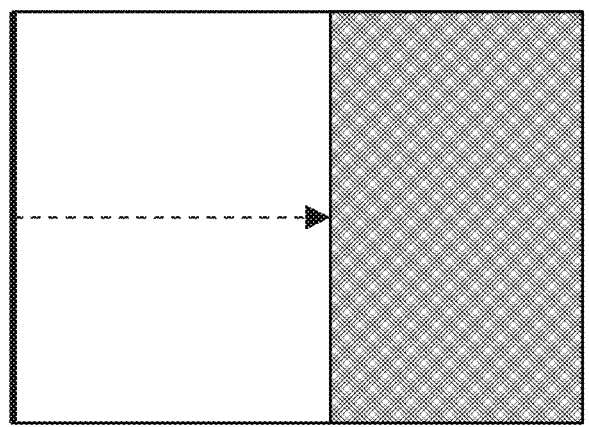

In order to calculate correction parameters from the trim chart C130, it is necessary to specify trimming widths in the read image. In order to specify the trimming widths, for example, as illustrated in FIG. 6B, it is sufficient to search a pixel toward the center of the read image starting from a side of the read image. A trimming width can be specified by using the fact that a change in a pixel value in the search direction is small since the color in the trimmed section is a paper color and that a pixel value significantly changes from the paper color when a painted part is hit.

Here, as described above, it is necessary to use the color chart C110 in order to calculate a correction parameter for correcting the chromogenic property. Similarly, in order to calculate correction parameters for correcting parallel movement, magnification, and skew, it is necessary to use the shape chart C120. Similarly, in order to calculate correction parameters for correcting trimming widths, it is necessary to use the trim chart C130. In this manner, in order to calculate correction parameters, it is necessary to use a chart corresponding to a type of the correction parameter.

Figure 7:
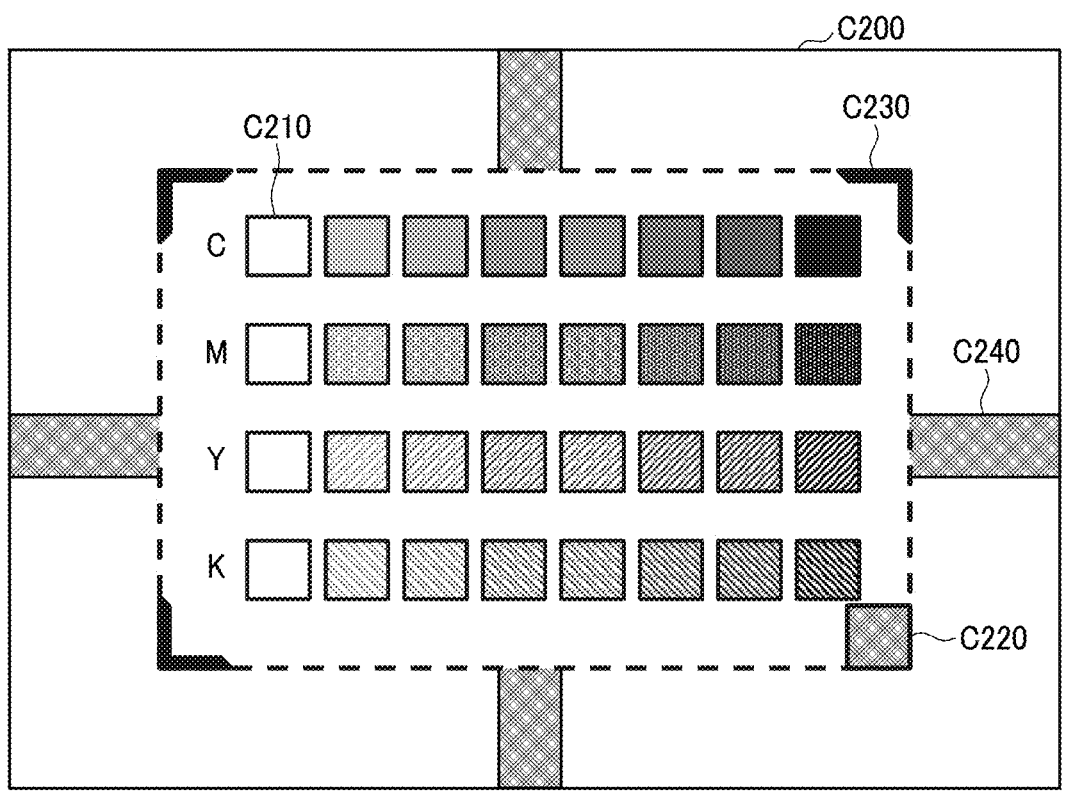
FIG. 7 is a diagram illustrating an example of an integrated chart for calculation of the correction parameter.

Therefore, the inspection device 40 according to the present embodiment uses an integrated chart C200 illustrated in FIG. 7, for example, to calculate a plurality of types of correction parameters by one chart. The integrated chart C200 illustrated in FIG. 7 is integration of the color chart C110, the shape chart C120, and the trim chart C130.

In the integrated chart C200 illustrated in FIG. 7, color patches C210, a position grasping marker C220, shape grasping markers C230, and trimming width specifying areas C240 are arranged.

In the integrated chart C200 illustrated in FIG. 7, the color patches C210 are arranged near the center, and the shape grasping markers C230 are arranged outside the color patches C210. In addition, the shape grasping markers C230 are arranged at the upper left, the lower left, and the upper right, and at the lower right the position grasping marker C220 is arranged. By arranging the position grasping marker C220 on the lower right, a lower right shape grasping marker C230 can be substituted by the position grasping marker C220.

Furthermore, in the integrated chart C200 illustrated in FIG. 7, the trimming width specifying areas C240 are arranged at the center of a peripheral portion of each of the sides. Arranging the trimming width specifying area C240 at the center of a peripheral portion of each of the sides results in no influence on specifying the position grasping marker C220 or specifying the shape grasping marker C230. That is, in the integrated chart C200 illustrated in FIG. 7, each of the chart elements for calculation of a correction parameter is arranged so as not to affect calculation of other correction parameters.

By using the integrated chart C200 illustrated in FIG. 7, correction parameters for correcting the chromogenic property can be calculated by the color patches C210 and the position grasping marker C220. Moreover, the shape grasping markers C230 enable calculation of correction parameters for correcting shape characteristics such as magnification, parallel movement, and skew. Furthermore, the trimming width specifying areas C240 enables calculation of correction parameters for correcting a trimming width.

As described above, by using the integrated chart C200 illustrated in FIG. 7, a plurality of types of correction parameters can be calculated with one chart. Note that the integrated chart C200 illustrated in FIG. 7 is integration of the three types of charts of the color chart C110, the shape chart C120, and the trim chart C130. However, other desirable types of charts may be integrated without being limited to the above.

<Functional Configuration of Engine Controller 20, Print Engine 30, and Inspection Device 40>

Figure 8:
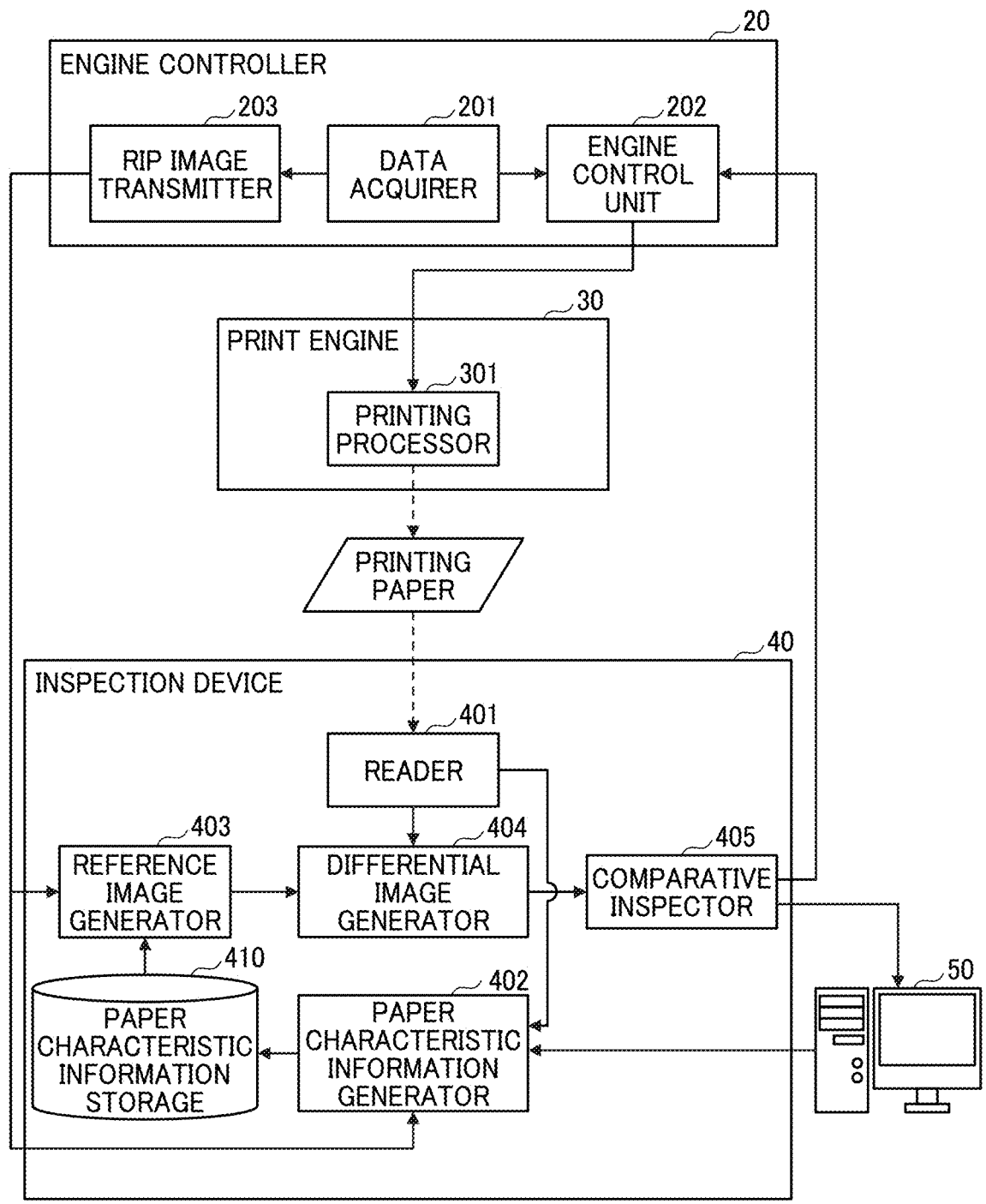
FIG. 8 is a diagram illustrating an example of a functional configuration of an engine controller, the print engine, and the inspection device according to the first embodiment.

Next, functional configurations of the engine controller 20, the print engine 30, and the inspection device 40 according to the present embodiment will be described with reference to FIG. 8. FIG. 8 is a diagram illustrating an example of functional configurations of the engine controller 20, the print engine 30, and the inspection device 40 according to the present embodiment.

<<Engine Controller 20>>

As illustrated in FIG. 8, the engine controller 20 according to the present embodiment includes a data acquirer 201, an engine control unit 202, and an RIP image transmitter 203. Each of these functional units is implemented by one or more programs installed in the engine controller 20 causing a CPU to execute processing of the programs.

The data acquirer 201 receives an RIP image from the DFE 10. The data acquirer 201 further outputs the received RIP image to the engine control unit 202 and the RIP image transmitter 203.

The engine control unit 202 causes the print engine 30 to execute image formation output on the basis of the RIP image input from the data acquirer 201.

The RIP image transmitter 203 transmits the RIP image input from the data acquirer 201 to the inspection device 40.

<<Print Engine 30>>

As illustrated in FIG. 8, the print engine 30 according to the present embodiment includes a print processor 301. This functional unit is implemented by one or more programs installed in the print engine 30 causing a CPU to execute processing of the programs.

The print processor 301 acquires the RIP image input from the engine controller 20 and executes image formation output on a paper. The print processor 301 then outputs the paper on which an image is formed and output (that is, printing paper that is printed). Note that the print processor 301 according to the present embodiment performs image formation by an electrophotographic method; however, other methods such as an inkjet method may be adopted, for example.

<<Inspection Device 40>>

As illustrated in FIG. 8, the inspection device 40 according to the present embodiment includes a reader 401, a paper characteristic information generator 402, a reference image generator 403, a differential image generator 404, and a comparative inspector 405. Each of these functional units is implemented by one or more programs installed in the inspection device 40 causing the CPU 41 to execute processing of the programs.

The inspection device 40 according to the present embodiment further has a paper characteristic information storage 410. The paper characteristic information storage 410 can be implemented by the HDD 44, for example.

The reader 401 reads the image formed on a surface of the printing paper (that is, the printing paper on which the image is formed and output by the print processor 301) output by the print engine 30 and generates a read image. The reader 401 is implemented by, for example, the reading device 81 and the reading device 82 provided inside the inspection device 40. The read image generated by the reader 401 is output to the paper characteristic information generator 402 in a case where paper characteristic information including correction parameters for each type of paper is generated. Meanwhile, in a case where the read image is inspected, the read image is output to the differential image generator 404.

The paper characteristic information generator 402 generates sheet characteristic information generator including correction parameters for each type of paper from the RIP image received from the engine controller 20 (that is, for example, an RIP image of the integrated chart C200) and the read image input from the reader 401. Note that the read image here is an image generated by the reader 401 reading the printing paper on which the RIP image of the integrated chart C200 is formed and output, for example.

The paper characteristic information generator 402 stores the generated paper characteristic information in the paper characteristic information storage 410.

The reference image generator 403 generates a reference image from the RIP image received from the engine controller 20 and the paper characteristic information stored in the paper characteristic information storage 410. In other words, the reference image generator 403 generates the reference image by correcting the received RIP image using the correction parameters included in the paper characteristic information. The generated reference image is output to the differential image generator 404.

The differential image generator 404 generates a differential image indicating a difference between the reference image input from the reference image generator 403 and the read image input from the reader 401. That is, the differential image generator 404 performs positional alignment between the reference image and the read image and then generates a differential image in which a difference between each pixel of the reference image and the read image corresponds to a pixel value of each pixel.

The comparative inspector 405 determines whether there is a defect in the read image on the basis of the magnitude relation between each pixel value of the differential image generated by the differential image generator 404 and a preset threshold value. Then, the comparative inspector 405 transmits the determination result to the user terminal 50. In a case where it is determined that there is a defect in the read image, the comparative inspector 405 transmits the determination result to the engine controller 20.

The paper characteristic information storage 410 stores the paper characteristic information generated by the paper characteristic information generator 402. Here, paper characteristic information stored in the paper characteristic information storage 410 will be described with reference to FIG. 9. FIG. 9 is a table illustrating an example of paper characteristic information.

As illustrated in FIG. 9, in paper characteristic information, a paper name and correction parameters are associated. The correction parameters include, for example, a main-scanning direction magnification, a sub-scanning direction magnification, a main-scanning direction parallel movement amount, a sub-scanning direction parallel movement amount, a skew amount, a trimming amount, and a color conversion look-up table (LUT) file name.

Of the above, the main-scanning direction magnification and the sub-scanning direction magnification are correction parameters for correcting the magnification. The main-scanning direction parallel movement amount and the sub-scanning direction parallel movement amount are correction parameters for correcting the parallel movement amount. The skew amount is a correction parameter for correcting the skew. The trimming amount is a correction parameter for correcting the trimming width. An electronic file indicated by a color conversion LUT file name is a correction parameter for correcting a chromogenic property.

Note that the correction parameters may include other correction parameters for correcting desired characteristics (e.g. dot gain, resolution of images, etc.) in addition to the above.

As described above, in the paper characteristic information, each paper name (for example, "plain paper A4 long edge feed (LEF)" or the like) indicating a type of paper is associated with correction parameters for correcting characteristics (e.g. chromogenic property, shape characteristics, etc.) generated when printing is performed with that paper name.

Here, as an example, a detailed functional configuration of the reference image generator 403 in a case where characteristics to be corrected include "magnification," "parallel movement," "trimming width," "colors," and "skew" will be described with reference to FIG. 10. FIG. 10 is a diagram illustrating an example of a detailed functional configuration of the reference image generator 403 according to the present embodiment.

As illustrated in FIG. 10, the reference image generator 403 according to the present embodiment includes a color converter 411, a parallel mover 412, a magnifier 413, a trimmer 414, a rotator 415, and an image output unit 416.

The color converter 411 refers to an electronic file indicated by a color conversion LUT file name included in the paper characteristic information and converts a color space (CMYK color space) of the RIP image into the same color space (RGB color space) as a color space of the read image. At this time, the color converter 411 also performs color conversion reflecting a chromogenic property of a paper. That is, the color converter 411 refers to the electronic file indicated by the color conversion LUT file name included in the paper characteristic information and corrects the RIP image such that a chromogenic property becomes the same as a chromogenic property of the read image.

Note that any method other than the color conversion LUT may be adopted for color conversion. Moreover, a color space of an RIP image is not limited to a CMYK color space. Similarly, a color space of a read image is not limited to an RGB color space.

The parallel mover 412 translates the RIP image on the basis of the main-scanning direction parallel movement amount and the sub-scanning direction parallel movement amount included in the paper characteristic information. That is, the parallel mover 412 uses the main-scanning direction parallel movement amount and the sub-scanning direction parallel movement amount included in the paper characteristic information to correct the RIP image such that parallel movement, out of the shape characteristics, generated by paper conveyance or other reasons is the same as parallel movement of the read image.

The magnifier 413 magnifies the RIP image on the basis of the main-scanning direction magnification and the sub-scanning direction magnification included in the paper characteristic information. That is, the magnifier 413 uses the main-scanning direction magnification and sub-scanning direction magnification included in the paper characteristic information to correct the RIP image such that magnification, out of the shape characteristics, generated by expansion/shrinkage of a paper or other reasons is the same as magnification of the read image.

The trimmer 414 trims the RIP image on the basis of a trimming amount included in the paper characteristic information. That is, the trimmer 414 uses the trimming amount included in the paper characteristic information to correct the RIP image such that a trimming width generated by a printing method such as the electrophotographic method becomes the same as a trimming width of the read image.

The rotator 415 rotates the RIP image on the basis of the skew amount included in the paper characteristic information. That is, the rotator 415 uses the skew amount included in the paper characteristic information to correct the RIP image such that the skew, out of the shape characteristics, generated by paper conveyance or other reasons becomes the same as skew of the read image.

The image output unit 416 outputs the RIP image corrected by the color converter 411 through to the rotator 415 described above as a reference image.

Note that the configuration of the reference image generator 403 is merely an example, and the configuration varies depending on characteristics of a target to be corrected. For example, in a case where the resolution of an RIP image is to be corrected, the reference image generator 403 includes a resolution convertor. Alternatively, for example in a case where parallel movement or skew are not to be corrected, the reference image generator 403 does not include the parallel mover 412 or the rotator 415.

<Generation Processing of Paper Characteristic Information>

Next, processing for generating paper characteristic information using the integrated chart C200 illustrated in FIG. 7 will be described with reference to FIG. 11. FIG. 11 is a flowchart illustrating an example of generation processing of paper characteristic information according to the present embodiment. In the following description, it is assumed that an RIP image of the integrated chart C200 illustrated in FIG. 7 is transmitted from the engine controller 20 to the inspection device 40 and that a printing paper, on which the RIP image is formed and output by the print processor 301, is output.

First, the paper characteristic information generator 402 acquires a paper name designated by a user in the user terminal 50, for example (step S1101). Note that the paper characteristic information generator 402 may acquire a paper name designated by the operating device 61 of the print engine 30, for example.

Next, the paper characteristic information generator 402 acquires the RIP image transmitted from the engine controller 20 (step S1102).

Next, the reader 401 reads the printing paper output by the print engine 30 (that is, a printing paper on which the RIP image of the integrated chart C200 illustrated in FIG. 7 is formed and output) and generates a read image (step S1103).

Next, the paper characteristic information generator 402 acquires the read image generated by the reader 401 (step S1104).

The paper characteristic information generator 402 then calculates correction parameters from the RIP image acquired in step S1102 above and the read image acquired in step S1104 above (step S1105).

That is, the paper characteristic information generator 402 specifies the color conversion LUT file name on the basis of the color patches C210 and the position grasping marker C220 of the integrated chart C200 illustrated in FIG. 7. The paper characteristic information generator 402 further calculates a main-scanning direction magnification and a sub-scanning direction magnification, a main-scanning direction parallel movement amount and a sub-scanning direction parallel movement amount, and a skew amount from the position grasping marker C220 of the integrated chart C200 illustrated in FIG. 7. Furthermore, the paper characteristic information generator 402 calculates a trimming amount from the trimming width specifying area C240 of the integrated chart C200 illustrated in FIG. 7.

Next, the paper characteristic information generator 402 associates the paper name acquired in the above step S1101 with the correction parameters calculated in the above step S1105 to generate paper characteristic information (step S1106).

Next, the paper characteristic information generator 402 stores the paper characteristic information generated in the above step S1106 in the paper characteristic information storage 410 (step S1107).

As a result, the paper characteristic information corresponding to the paper name designated by the user is generated and stored in the paper characteristic information storage 410. Here in the present embodiment, by using the integrated chart C200 illustrated in FIG. 7, a plurality of types of correction parameters can be calculated from a single pair of the RIP image and the read image. Therefore, even in a case where a plurality of types of correction parameters is required in image inspection which will be described later, a user can efficiently calculate necessary correction parameters from one type or a small number of types of charts.

In a case where the number of targets to be corrected is large, the number of types of charts for calculation of correction parameters also rises. Therefore, in the case where the number of correction targets is large, the user has to create a plurality of read images from a plurality of charts corresponding to these correction targets, in a separate manner. Therefore, in the case where the number of correction targets is large, calculation of correction parameters requires time and effort.

however as described above, according to the inspection device 40 according to the embodiment, time and effort of the user required for calculation of correction parameters can be reduced. Moreover, since a plurality of types of correction parameters can be calculated from one or few types of charts, it is possible to reduce the amount of toner and other resources required for calculation of the correction parameters.

<Image Inspection Processing>

Next, processing in the case of performing image inspection using paper characteristic information will be described with reference to FIG. 12. FIG. 12 is a flowchart illustrating an example of image inspection processing according to the present embodiment. In the following description, it is assumed that the RIP image as a document image to be inspected is transmitted from the engine controller 20 to the inspection device 40 and that a printing paper (inspection target), on which the RIP image is formed and output by the print processor 301, is output.

First, the reference image generator 403 acquires the RIP image transmitted from the engine controller 20 (step S1201).

Next, the reference image generator 403 acquires, from among paper characteristic information stored in the paper characteristic information storage 410, paper characteristic information of a paper name indicating the type of the paper on which the RIP image acquired in the above step S1201 is printed (step S1202).

Next, the reference image generator 403 generates a reference image from the RIP image using the paper characteristic information acquired in the above step S1202 (step S1203). Details of the processing of generating the reference image will be described later.

Next, the differential image generator 404 acquires the reference image generated in the above step S1203 (step S1204).

Then, the reader 401 reads the printing paper output from the print engine 30 (that is, a printing paper to be inspected) and generates a read image (step S1205).

Thereafter, the differential image generator 404 acquires the read image generated in the above step S1205 (step S1206).

The differential image generator 404 then generates a differential image from the reference image acquired in the above step S1204 and the read image acquired in the above step S1206 (step S1207). That is, the differential image generator 404 performs positional alignment between the reference image and the read image and then generates a differential image in which a difference between each pixel of the reference image and the read image corresponds to a pixel value of each pixel.

Next, the comparative inspector 405 determines whether there is a defect in the read image on the basis of the magnitude relation between each pixel value of the differential image generated by the differential image generator 404 and a preset threshold value (step S1208). That is, the comparative inspector 405 determines that there is a defect in the read image when there are pixels having pixel values larger (or smaller) than the preset threshold value in the pixels of the differential image, for example.

Then, the comparative inspector 405 transmits the determination result to the user terminal 50. In a case where it is determined that there is a defect in the read image, the comparative inspector 405 transmits the determination result to the engine controller 20.

As described above, by correcting the RIP image, which is the document image to be inspected, by correction parameters, it is possible to generate a reference image having the same characteristics as characteristics of the read image generated by reading the inspection target. As a result, in the inspection device 40 according to the present embodiment, it is possible to inspect an inspection target for each page even with a print on demand, for example. Note that in the case where there is a plurality of pages, it is sufficient to repeat the above processing of steps S1201 to S1208 for each page.

Here, the generation processing of the reference image in the above step S1201 will be described with reference to FIG. 13. FIG. 13 is a flowchart illustrating an example of the generation processing of a reference image according to the present embodiment.

First, the color converter 411 of the reference image generator 403 refers to an electronic file indicated by a color conversion LUT file name included in the paper characteristic information and converts a color space of the RIP image into the same color space as a color space of the read image (step S1301).

Next, the parallel mover 412 of the reference image generator 403 translates the RIP image on the basis of the main-scanning direction parallel movement amount and the sub-scanning direction parallel movement amount included in the paper characteristic information (step S1302).

Next, the magnifier 413 of the reference image generator 403 magnifies the RIP image on the basis of the main-scanning direction magnification and the sub-scanning direction magnification included in the paper characteristic information (step S1303).

Next, the trimmer 414 of the reference image generator 403 trims the RIP image on the basis of a trimming amount included in the paper characteristic information (step S1304).

Next, the rotator 415 of the reference image generator 403 rotates the RIP image on the basis of a skew amount included in the paper characteristic information (step S1305).

Next, the image output unit 416 of the reference image generator 403 outputs the RIP image having been subjected to the correction of the above steps S1301 to S1305 as a reference image (step S1306). As a result, a reference image having the same characteristics as characteristics of the read image is generated according to the type of a paper.

<Another Example of Integrated Chart>

Here, another example of a chart (integrated chart) that allows for efficient calculation of a plurality of types of correction parameters will be described.

<<Still Another Example of Integrated Chart (Part 1)>>

Since an integrated chart C300 illustrated in FIG. 14 has a large number of color patches, an integrated chart C310 of a first page and an integrated chart C320 of a second page are included. In the integrated chart C310 of the first page, light color patches C311 are arranged. Meanwhile in the integrated chart C320 of the second page, dark color patches C321 are arranged.

Here, in the integrated chart C310 of the first page, trimming width specifying areas C312 for specifying a trimming width are arranged only in the sub-scanning direction. This is because there are cases where colorimetry cannot be accurately performed on the light color patches C311 due to the influence of flares of the trimming width specifying areas C312 at the time of reading since a difference in color density between the light color patches C311 and the trimming width specifying areas C312 is large. Note that since the reading device is a line scanner and the occurrence of flares is speculated only in the main-scanning direction, trimming width specifying areas C312 in the sub-scanning direction are arranged.

Meanwhile in the integrated chart C320 of the second page, trimming width specifying areas C322 in the main-scanning direction and the sub-scanning direction are arranged.

Note that in the case where the number of color patches is even larger, the integrated chart C300 may include three or more pages.

<<Yet Another Example of Integrated Chart (Part 2)>>

Figure 15:
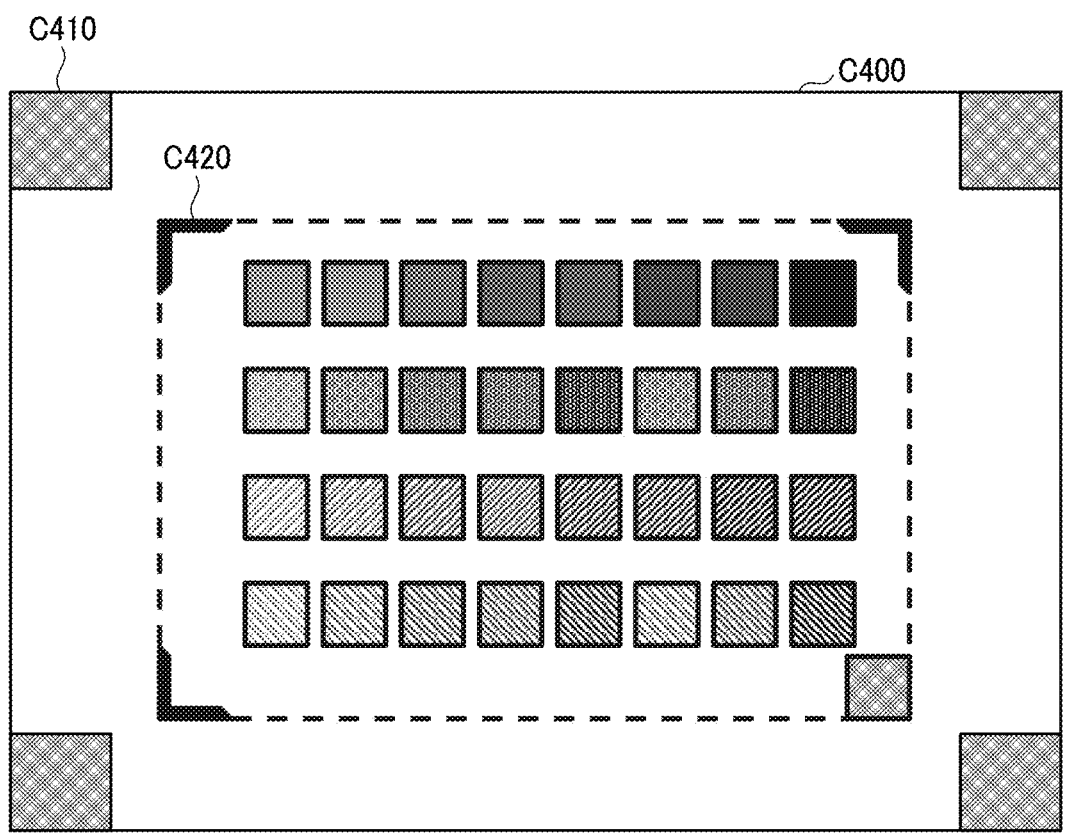
FIG. 15 is a diagram illustrating still another example (part 2) of the integrated chart for calculation of the correction parameter.

In an integrated chart C400 illustrated in FIG. 15, trimming width specifying areas C410 for specifying trimming widths are arranged at the four corners. By arranging the trimming width specifying areas C410 at the four corners, for example various markers and the like for calculation of other correction parameters can be arranged near the center of each of the sides.

Figure 16:
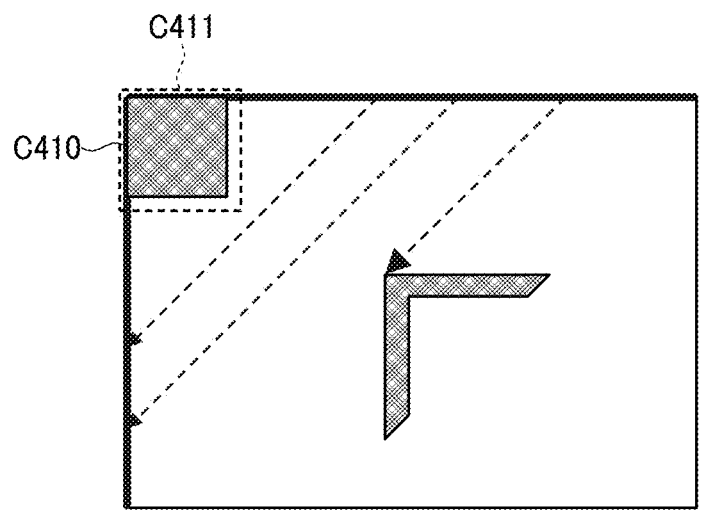
FIG. 16 is a diagram for explaining another example (part 1) of the method for calculating the correction parameter.

In the case where the trimming width specifying areas C410 are arranged at the four corners, the trimming width specifying areas C410 become obstacles, which hinders searching of the shape grasping markers C420 by the method described in FIG. 6A. Therefore, in this case in searching of the shape grasping markers C420, it is sufficient to search a shape grasping marker C420 in a range excluding an area C411 around the trimming width specifying area C410 as illustrated in FIG. 16.

<<Still Yet Another Example of Integrated Chart (Part 3)>>

Figure 17:
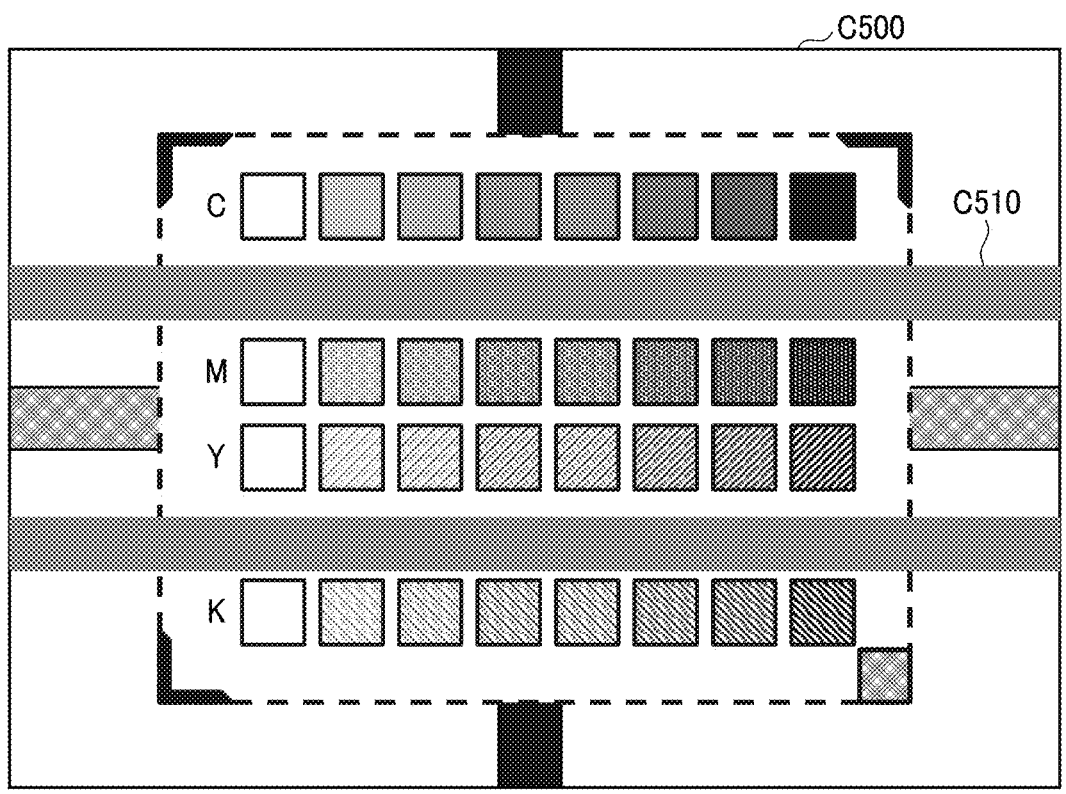
FIG. 17 is a diagram illustrating still yet another example (part 3) of the integrated chart for calculation of the correction parameter.

In an integrated chart C500 illustrated in FIG. 17, main-scanning deviation specifying areas C510 for correcting color unevenness (main-scanning deviation) in the main-scanning direction generated in the print engine 30 that performing printing by the electrophotographic method are arranged. The main-scanning deviation specifying areas C510 are arranged so as not to overlap with color patches, trimming width specifying areas, and other areas.

Figure 18:
FIG. 18 is a diagram for explaining still another example (part 2) of the method for calculating the correction parameter.

In order to specify the main-scanning deviation, it is sufficient to set a plurality of regions C511 in each of the main-scanning deviation specifying areas C510 to perform colorimetry on each of the plurality of regions C511 to specify unevenness in colors as illustrated in FIG. 18.

Note that the specified main-scanning deviation (color unevenness) is only required to be adjusted so as to be uniform by adjustment of a toner density or adjustment of pixel values of an image, for example.

Second Embodiment

Next, a second embodiment will be described. In printing by the electrophotographic method which is often used in print on demand, generally printing cannot be performed on edges of a paper. Therefore, in printing by the electrophotographic method, an image region corresponding to the edges is trimmed. Here, in a case where a read image is inspected, it is conceivable to generate a reference image by applying similar trimming to an RIP image that is a document image.

However, there are cases where trimming widths of a read image and a reference image do not coincide due to parallel movement, magnification, etc. due to conveyance of paper, fixing of toner, or other reasons. For this reason, there are cases where it is erroneously determined that the read image has a defect.

Therefore in the second embodiment, a case where erroneous determination of image inspection is prevented by properly reflecting trimming widths also to a reference image will be described. Note that in the second embodiment, differences from the first embodiment will be mainly described, and description of a component similar to a component in the first embodiment will be omitted as appropriate.

<Comparison Between Reference Image and Read Image>

As described above, the inspection device 40 according to the present embodiment compares a reference image and a read image to inspect a result of the image formation output by the print engine 30.

Here, an RIP image is represented in an image size based on the setting of a print job. Meanwhile, edges of the read image are trimmed when printed by the print engine 30.

Figure 19A:
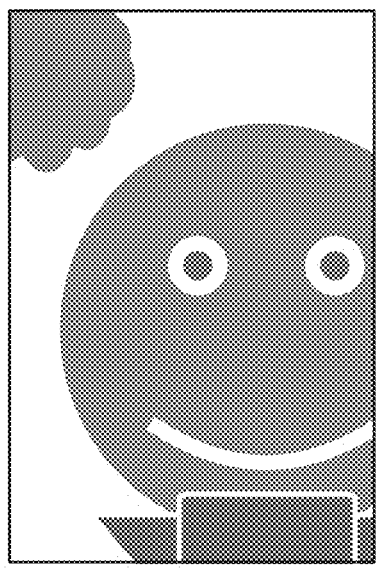
FIGS. 19A and 19B are diagrams for explaining an example where an RIP image and a read image according to a second embodiment cannot be directly compared.
Figure 19B:
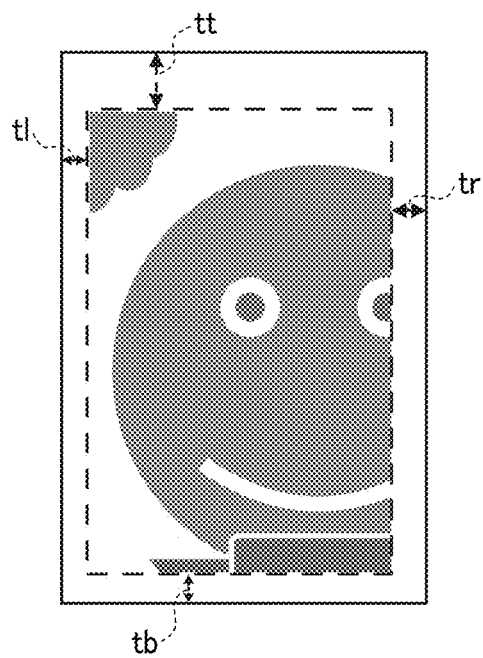

For example, as illustrated in FIG. 19A, an RIP image is represented in an image size based on the setting of a print job. Meanwhile, a read image is trimmed by a width tt at an upper part, a width tb at a lower part, a width tl at a left part, and a width tr at a right part.

In this manner, there is a difference between the RIP image and the read image in the parts trimmed in the read image. Therefore, comparison between the reference image and the read image with the RIP image serving as the reference image does not allow a result of image formation output by the print engine 30 to be inspected. Therefore, the inspection device 40 according to the present embodiment compares a reference image, generated by correcting an RIP image with a correction parameter indicating a trimming width calculated from a chart, and a read image to inspect a result of image formation output by the print engine 30. The correction parameter can be calculated from the read image obtained by reading a printing paper on which a dedicated chart is printed.

<Chart for Calculation of Correction Parameter>

Here, a chart for calculation of a correction parameter indicating a trimming width will be described. The inspection device 40 according to the present embodiment uses a trim chart C600 illustrated in FIG. 20 for example to calculate correction parameters indicating upper, lower, right, and left trimming widths.

Figure 20:
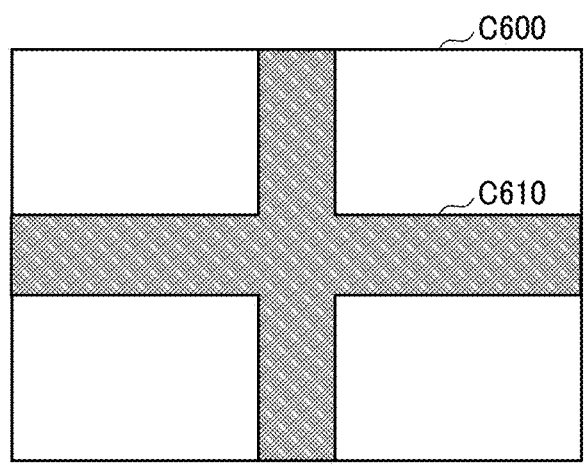
FIG. 20 is a diagram illustrating an example of a trim chart for calculation of a correction parameter (trimming width)

In the trim chart C600 illustrated in FIG. 20, a trimming width specifying area C610 for specifying the upper, lower, left, and right trimming widths is arranged.

Figure 21:
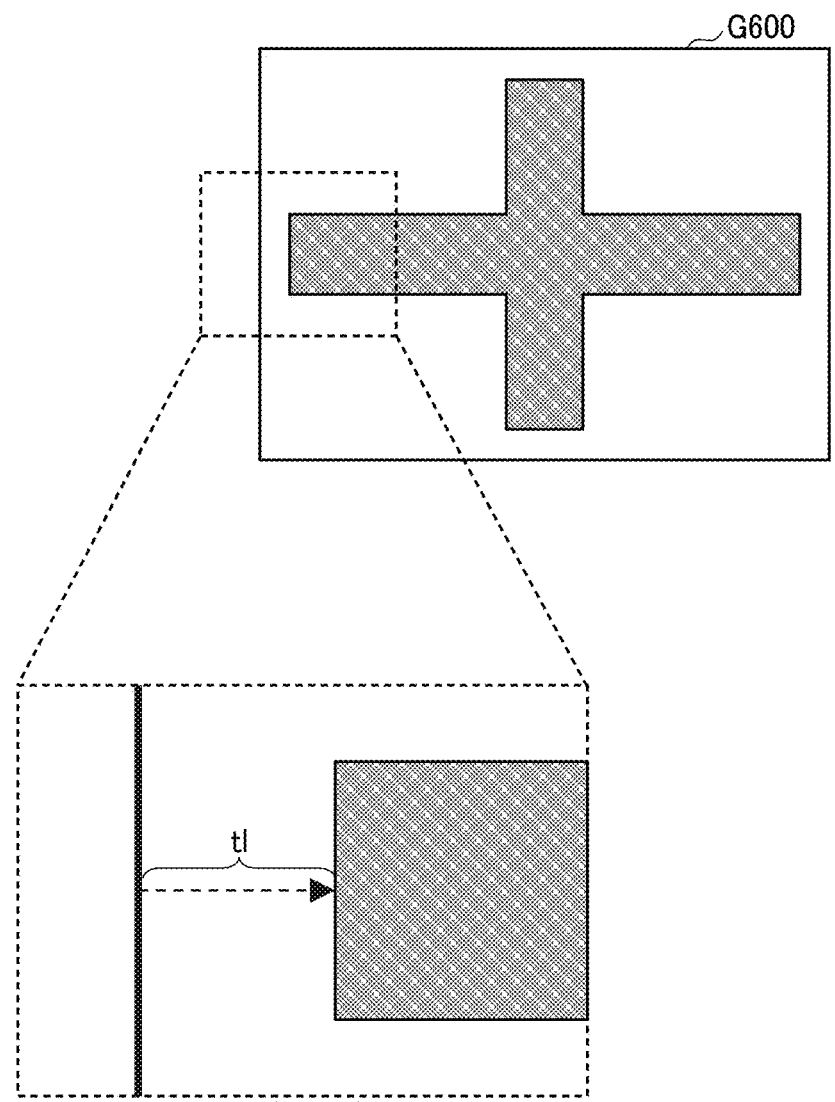
FIG. 21 is a diagram for explaining an example of a method for calculating the correction parameter (trimming width)

In order to calculate correction parameters (the upper, lower, left, and right trimming widths) from the trim chart C600, it is necessary to specify trimming widths in the read image. In order to specify the trimming widths, for example, as illustrated in FIG. 21, it is sufficient to search a pixel toward the center of the read image starting from a side of the read image. A trimming width can be specified by using the fact that a change in a pixel value in the search direction is small since the color in the trimmed section is a paper color and that a pixel value significantly changes from the paper color when the trimming width specifying area C610 is hit.

<Functional Configuration of Engine Controller 20, Print Engine 30, and Inspection Device 40>

Figure 22:
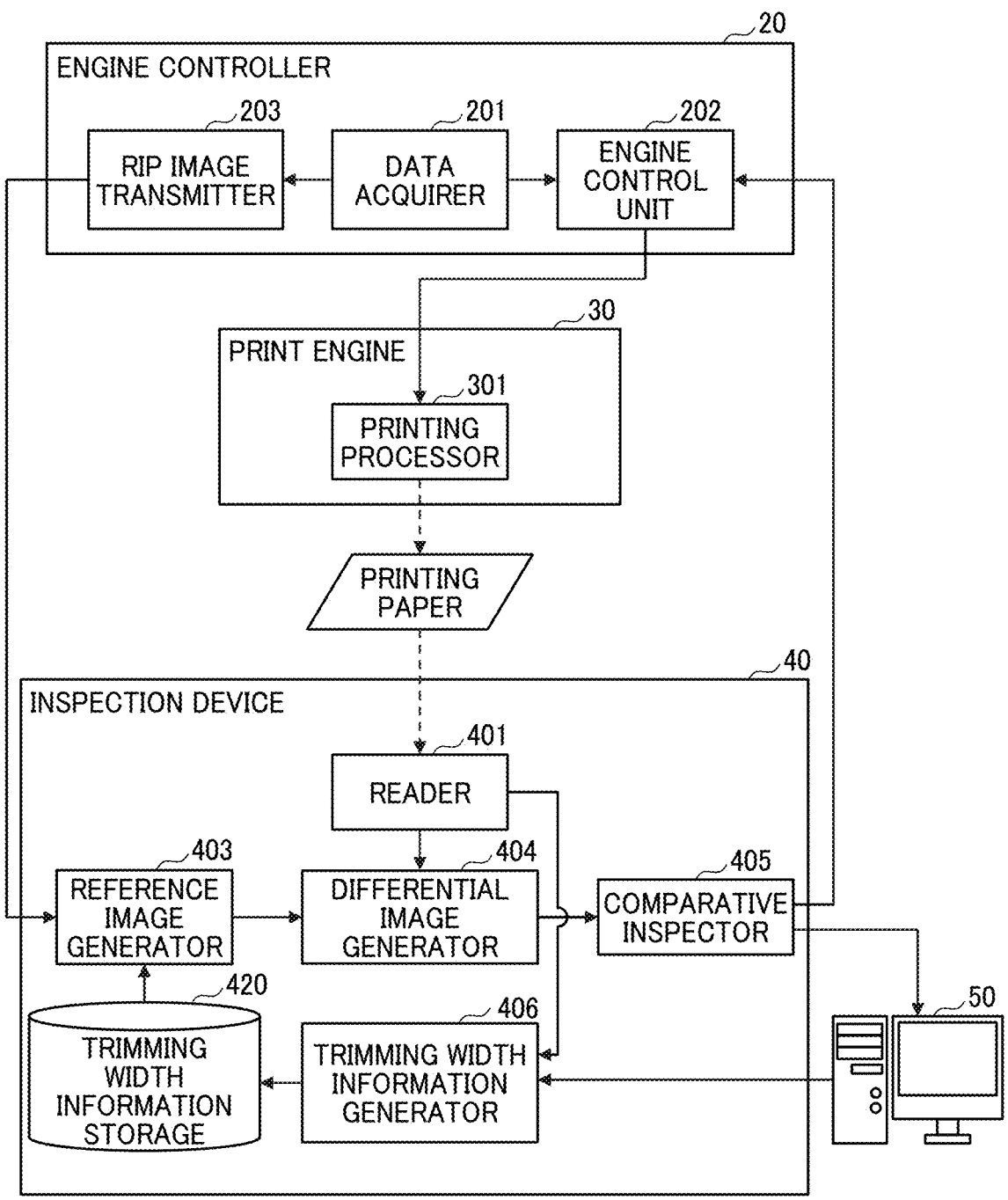
FIG. 22 is a diagram illustrating an example of a functional configuration of an engine controller, a print engine, and an inspection device according to the second embodiment.

Next, functional configurations of an engine controller 20, the print engine 30, and the inspection device 40 according to the present embodiment will be described with reference to FIG. 22. FIG. 22 is a diagram illustrating an example of functional configurations of the engine controller 20, the print engine 30, and the inspection device 40 according to the present embodiment. Note that since the functional configurations of the engine controller 20 and the print engine 30 are similar to those of the first embodiment, description will be omitted.

<<Inspection Device 40>>

As illustrated in FIG. 22, the inspection device 40 according to the present embodiment includes a reader 401, a reference image generator 403, a differential image generator 404, a comparative inspector 405, and a trimming width information generator 406. Each of these functional units is implemented by one or more programs installed in the inspection device 40 causing the CPU 41 to execute processing of the programs.

The inspection device 40 according to the present embodiment further has a trimming width information storage 420. The trimming width information storage 420 can be implemented by an HDD 44, for example.

Note that since the reader 401, the differential image generator 404, and the comparative inspector 405 are substantially similar to those of the first embodiment, description will be omitted.

The trimming width information generator 406 generates trimming width information including correction parameters indicating upper, lower, left, and right trimming widths from a read image input from the reader 401. Note that the read image here is an image generated by the reader 401 reading a printing paper on which an RIP image of the trim chart C600 is formed and output, for example.

Then, the trimming width information generator 406 stores the generated trimming width information in the trimming width information storage 420.

The reference image generator 403 generates a reference image from the RIP image received from the engine controller 20 and the trimming width information stored in the trimming width information storage 420. In other words, the reference image generator 403 generates the reference image by correcting the received RIP image using the correction parameters included in the trimming width information.

Figure 23:
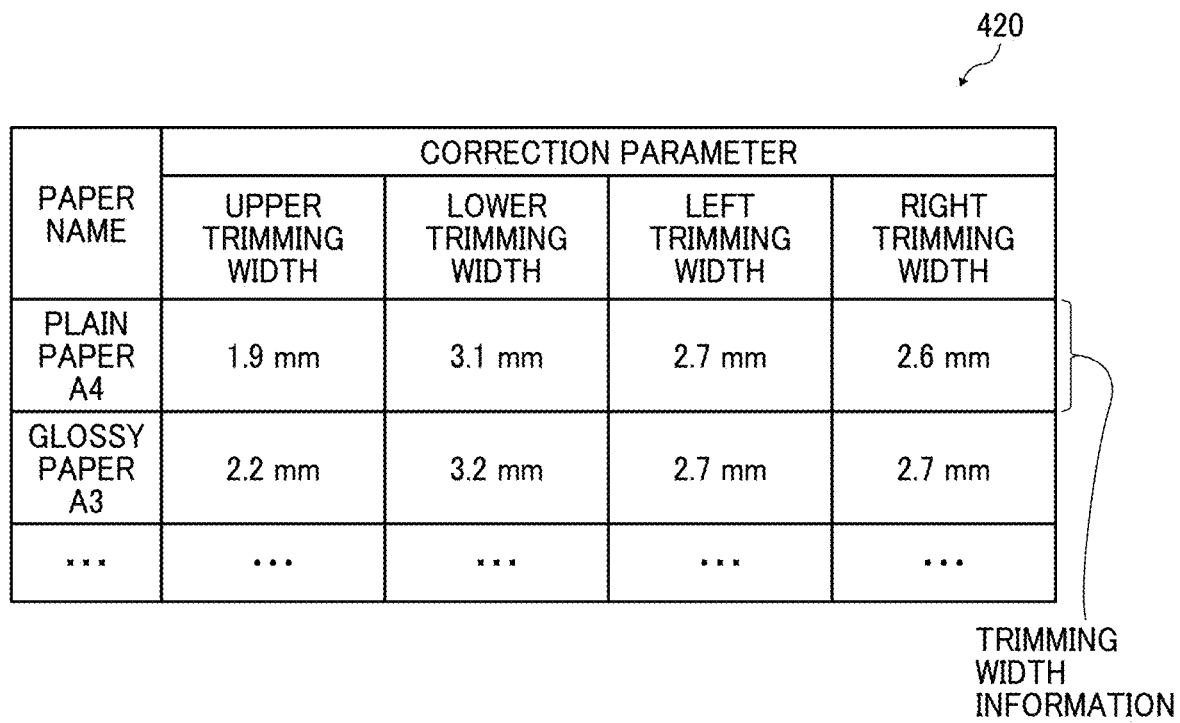
FIG. 23 is a table illustrating an example of trimming width information.

The trimming width information storage 420 stores the trimming width information generated by the trimming width information generator 406. Here, the trimming width information stored in the trimming width information storage 420 will be described with reference to FIG. 23. FIG. 23 is a table illustrating an example of trimming width information.

As illustrated in FIG. 23, in trimming width information, a paper name and correction parameters are associated. The correction parameters include an upper trimming width, a lower trimming width, a left trimming width, and a right trimming width.

As described above, in the trimming width information, each paper name (for example, "plain paper A4 LEF" or the like) indicating a type of paper is associated with correction parameters for correcting upper, lower, left, and right trimming widths generated when printing is performed with that paper name.

Figure 24:
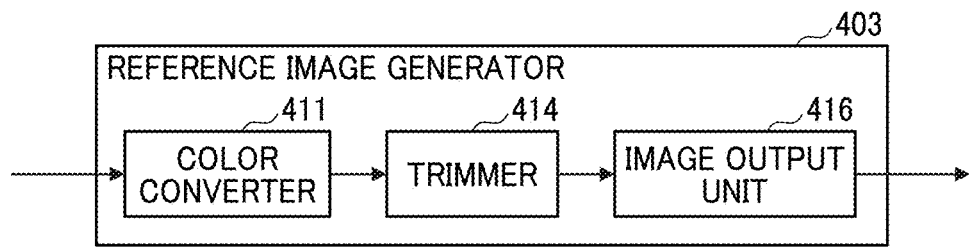
FIG. 24 is a diagram illustrating an example of a detailed functional configuration of a reference image generator according to the second embodiment.

Here, a detailed functional configuration of the reference image generator 403 in the case where trimming widths to be corrected include upper, lower, left, and right trimming widths will be described with reference to FIG. 24. FIG. 24 is a diagram illustrating an example of a detailed functional configuration of the reference image generator 403 according to the present embodiment.

As illustrated in FIG. 24, the reference image generator 403 according to the present embodiment includes a color converter 411, a trimmer 414, and an image output unit 416.

Like in the first embodiment, the color converter 411 converts a color space (CMYK color space) of the RIP image into the same color space (RGB color space) as a color space of the read image. At this time, the color converter 411 also performs color conversion reflecting a chromogenic property of a paper.

Note that the color converter 411 may use a color conversion LUT like in the first embodiment or may use a method other than the color conversion LUT. Moreover, a color space of an RIP image is not limited to a CMYK color space. Similarly, a color space of a read image is not limited to an RGB color space.

The trimmer 414 trims the RIP image on the basis of the upper, lower, left, and right trimming widths included in the trimming width information. That is, the trimmer 414 uses the upper, lower, left, and right trimming widths included in the trimming width information to correct the RIP image such that trimming widths generated by a printing method such as the electrophotographic method becomes the same as trimming widths of the read image.

The image output unit 416 outputs the RIP image corrected by the color converter 411 and the trimmer 414 described above as a reference image.

Note that the configuration of the reference image generator 403 is merely an example, and the configuration varies depending on characteristics of a target to be corrected. For example, in a case where the resolution of an RIP image is to be corrected, the reference image generator 403 includes a resolution convertor. Alternatively, for example, in a case where a chromogenic property is not to be corrected, the reference image generator 403 does not include the color converter 411.

<Generation Processing of Trimming Width Information>

Next, processing of generating the trimming width information using the trim chart C600 illustrated in FIG. 20 will be described with reference to FIG. 25. FIG. 25 is a flowchart illustrating an example of generation processing of the trimming width information according to the present embodiment. Hereinafter, it is assumed that a printing paper on which an RIP image of the trim chart C600 illustrated in FIG. 20 is formed and output by the print processor 301 is output.

First, the trimming width information generator 406 acquires a paper name designated by a user in a user terminal 50, for example (step S2501). Note that the trimming width information generator 406 may acquire a paper name designated by an operating device 61 of the print engine 30, for example.

Next, the reader 401 reads the printing paper output by the print engine 30 (that is, a printing paper on which the RIP image of the trim chart C600 illustrated in FIG. 20 is formed and output) and generates a read image (step S2502).

Next, the trimming width information generator 406 acquires the read image generated by the reader 401 (step S2503).

Next, the trimming width information generator 406 calculates correction parameters (that is, upper, lower, right and left trimming widths) from the read image acquired in the above step S2503 (step S2504). That is, the trimming width information generator 406 specifies the upper, lower, left, and right trimming widths from the trimming width specifying area C610 in the main-scanning direction and the sub-scanning direction.

Next, the trimming width information generator 406 associates the paper name acquired in the above step S2501 with the correction parameters calculated in the above step S2504 to generate the trimming width information (step S2505).

Next, the trimming width information generator 406 stores the trimming width information generated in the above step S2505 in the trimming width information storage 420 (step S2506).

As a result, the trimming width information corresponding to the paper name designated by the user is generated and stored in the trimming width information storage 420. At this time in the present embodiment, by using the trim chart C600 illustrated in FIG. 20, correction parameters indicating the upper, lower, left, and right trimming widths can be calculated.

<Image Inspection Processing>

Next, processing in the case of performing image inspection using trimming width information will be described with reference to FIG. 26. FIG. 26 is a flowchart illustrating an example of image inspection processing according to the present embodiment. In the following description, it is assumed that the RIP image as a document image to be inspected is transmitted from the engine controller 20 to the inspection device 40 and that a printing paper (inspection target), on which the RIP image is formed and output by the print processor 301, is output.

First, the reference image generator 403 acquires the RIP image transmitted from the engine controller 20 (step S2601).

Next, the reference image generator 403 acquires, from among trimming width information stored in the trimming width information storage 420, trimming width information of a paper name indicating the type of the paper on which the RIP image acquired in the above step S2601 is printed (step S2602).

Next, the reference image generator 403 generates a reference image from the RIP image using the trimming width information acquired in the above step S2602 (step S2603). Processing of subsequent steps S2604 to S2608 is similar to the processing of steps S1204 to S1208 of FIG. 12, respectively, and thus explanation will be omitted.

As described above, by correcting the RIP image, which is a document image to be inspected, by correction parameters (upper, lower, left, and right trimming widths), it is possible to generate a reference image having the same trimming widths as trimming widths of the read image generated by reading the inspection target. Note that in the case where there is a plurality of pages, it is sufficient to repeat the above processing of steps S2601 to S2608 for each page.

Here, the generation processing of the reference image in the above step S2603 will be described with reference to FIG. 27. FIG. 27 is a flowchart illustrating an example of the generation processing of a reference image according to the present embodiment.

First, the color converter 411 of the reference image generator 403 converts a color space of the RIP image into the same color space as a color space of the read image (step S2701).

Next, the trimmer 414 of the reference image generator 403 trims the RIP image on the basis of the upper, lower, left, and right trimming widths included in the trimming width information (step S2702). That is, the trimmer 414 deletes an area extending from the upper side of the RIP image by the upper trimming width. Similarly, the trimmer 414 deletes an area extending from the lower side of the RIP image by the lower trimming width. Similarly, the trimmer 414 deletes an area extending from the left side of the RIP image by the left trimming width. Further similarly, the trimmer 414 deletes an area extending from the right side of the RIP image by the right trimming width.

Next, the image output unit 416 of the reference image generator 403 outputs the RIP image having been subjected to the correction of the above steps S2701 to S2702 as the reference image (step S2703). As a result, a reference image having the same trimming widths as trimming widths of the read image is generated according to the type of a paper.

<Case where there is Contamination in Read Image>

For example, there are cases where contamination adheres to a printing paper at the time of printing or reading. Thus there are cases where this contamination stay adhering to the read image and hinders specifying of an accurate trimming width. In this case, therefore, an erroneous determination may occur in image inspection.

Figure 28:
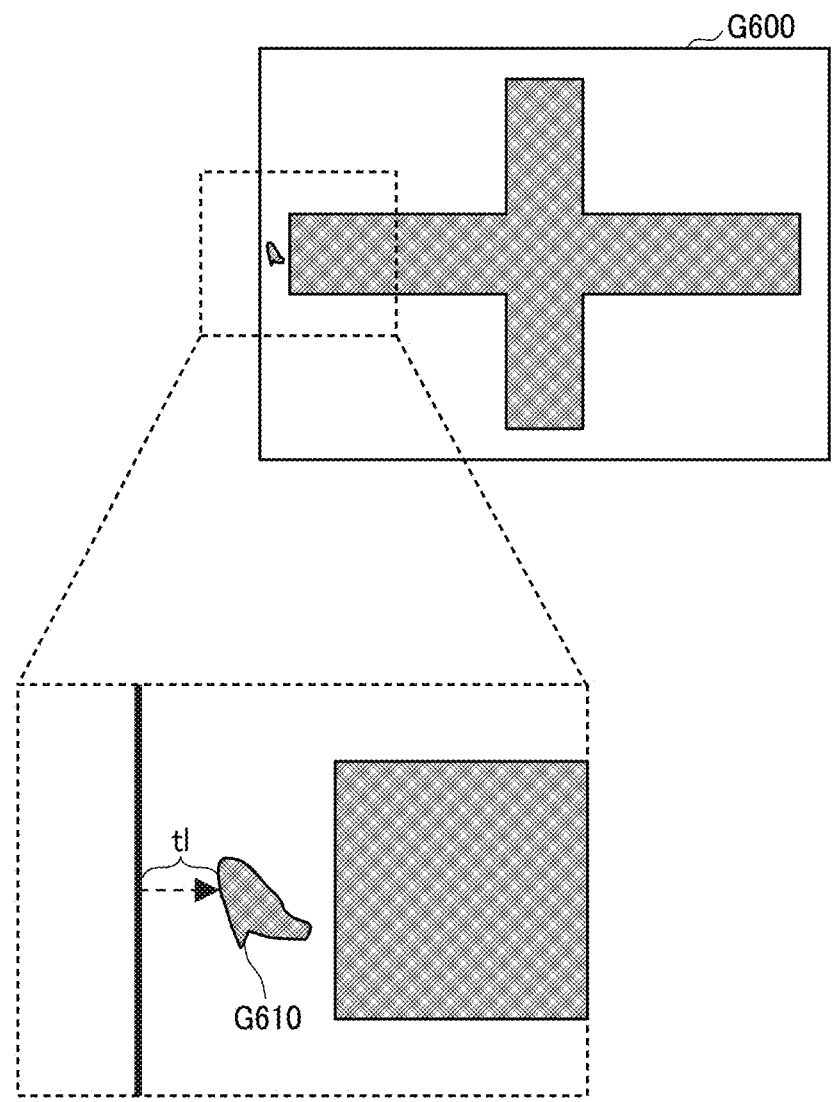
FIG. 28 is a diagram for describing a case where there is contamination in calculation of the correction parameter (trimming width)

For example, as illustrated in FIG. 28, let us assume that contamination G610 adheres to a read image G600. In this case, a width tl smaller than an actually trimmed width may be calculated as the left trimming width.

Figure 29:
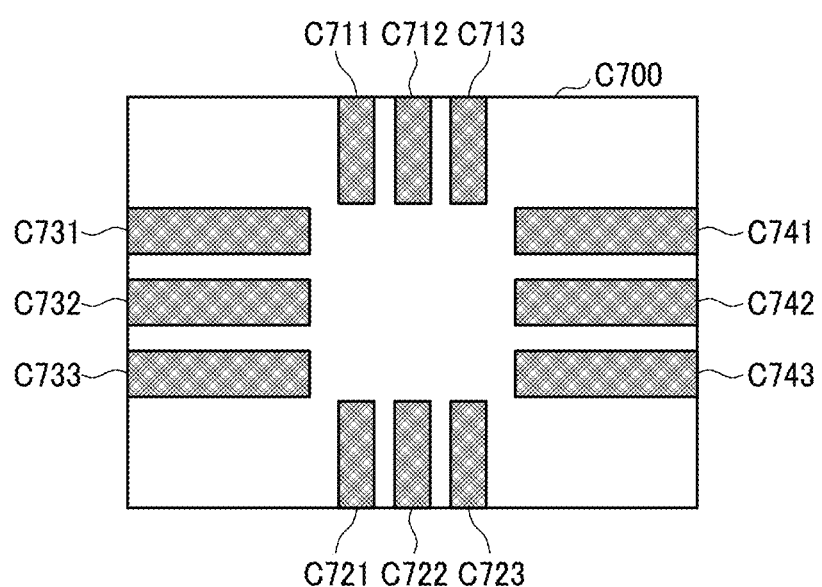
FIG. 29 is a diagram illustrating another example of the trim chart for calculation of the correction parameter (trimming width)

Therefore, by using a trim chart C700 illustrated in FIG. 29, robustness against contamination can be enhanced. In the trim chart C700 illustrated in FIG. 29, trimming width specifying areas C711 to C713 for specifying an upper trimming width and trimming width specifying areas C721 to C723 for specifying a lower trimming width are arranged. Furthermore, in the trim chart C700 illustrated in FIG. 29, trimming width specifying areas C731 to C733 for specifying a left trimming width and trimming width specifying areas C741 to C743 for specifying a right trimming width are arranged.

Figure 30:
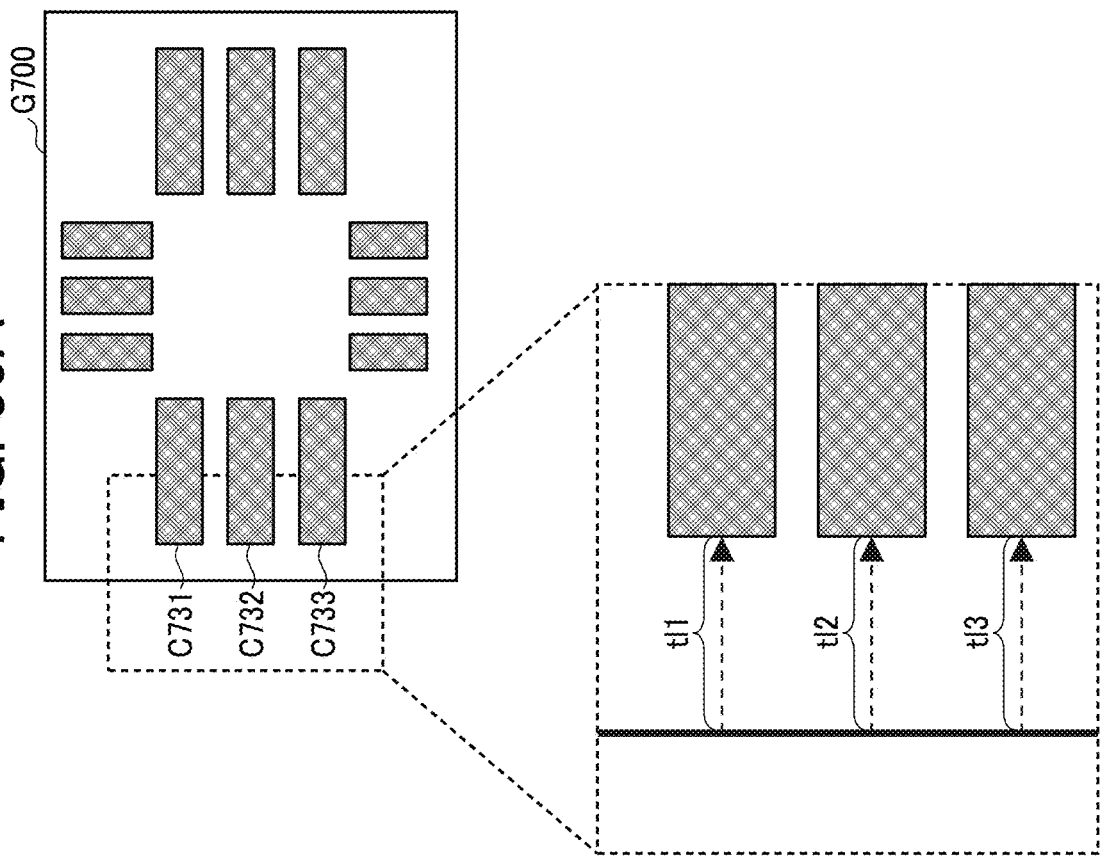
FIGS. 30A and 30B are diagrams for explaining a case where there is no contamination and a case where there is contamination in the calculation of the correction parameter (trimming width)

As a result, for example, as illustrated in FIG. 30A, trimming widths tl1 to tl3 can be specified from the trimming width specifying areas C711 to C713, respectively. Therefore, in this case, the left trimming width may be set as an average value of tl1, tl2, and tl3.

On the other hand, for example in a case where there is contamination as illustrated in FIG. 30B, one trimming width tl2 becomes an outlier with respect to the other trimming widths tl1 and tl3. Therefore, in this case for example, it is sufficient to remove the outlier tl2 first. Then a left trimming width can be set as an average value of tl1 and tl3.

In this manner, by arranging a plurality of trimming width specifying areas on one side, robustness against contamination can be enhanced. Note that in the trim chart C700 illustrated in FIG. 29, three trimming width specifying areas are arranged for each of the sides; however, the number of trimming width specifying areas arranged is not limited to three. Any number of trimming width specifying areas may be arranged. In general, by increasing the number of trimming width specifying areas arranged in one side, robustness against contamination can be enhanced.

<Another Example of Generation Processing of Trimming Width Information>

Figure 31:
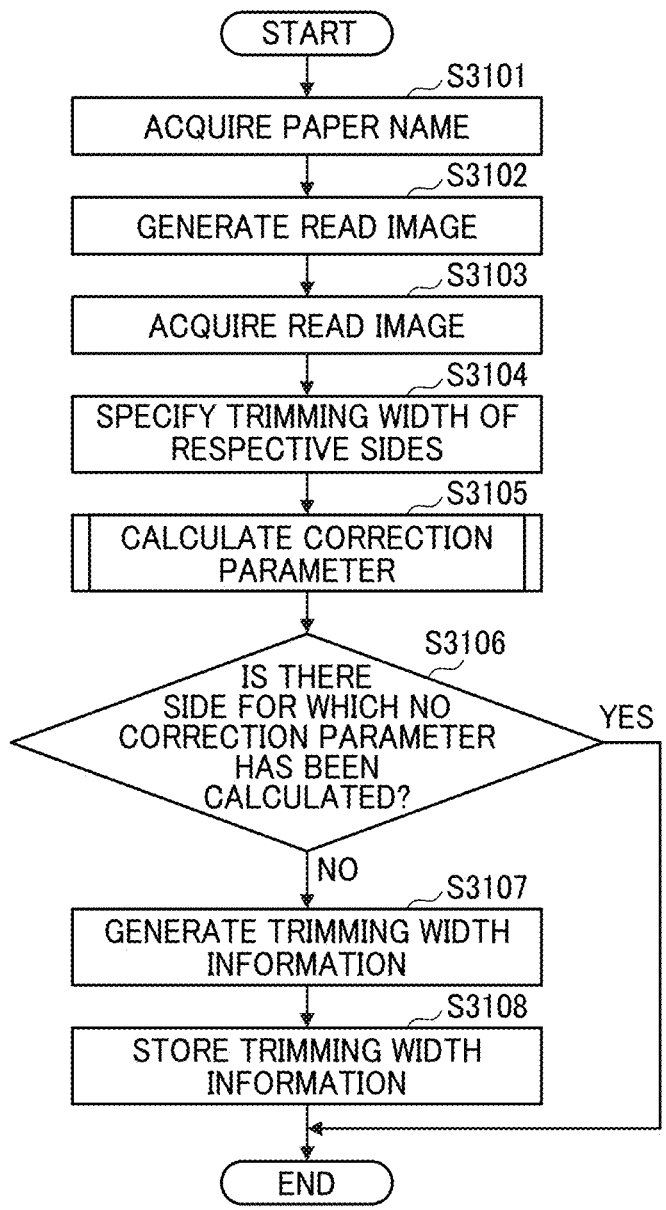
FIG. 31 is a flowchart illustrating another example of the generation processing of the trimming width information according to the second embodiment.

Next, processing of generating the trimming width information using the trim chart C700 illustrated in FIG. 29 will be described with reference to FIG. 31. FIG. 31 is a flowchart illustrating another example of generation processing of trimming width information according to the present embodiment. Hereinafter, it is assumed that a printing paper on which an RIP image of the trim chart C700 illustrated in FIG. 29 is formed and output by the print processor 301 is output. Note that processing of subsequent steps S3101 to S3103 is similar to the processing of steps S2501 to S2503 of FIG. 25, respectively, and thus explanation will be omitted.

After step S3103, the trimming width information generator 406 specifies a trimming width of each of the sides of a read image (step S3104). That is, the trimming width information generator 406 specifies trimming widths tl1, tl2, and tl3 on the left side of the read image. Similarly, the trimming width information generator 406 specifies the trimming widths tr1, tr2, and tr3 on the right side of the read image. Similarly, the trimming width information generator 406 specifies the trimming widths tt1, tt2, and tt3 on the upper side of the read image. Similarly, the trimming width information generator 406 specifies the trimming widths tb1, tb2, and tb3 on the lower side of the read image.

Next, the trimming width information generator 406 calculates correction parameters (that is, an upper trimming width, a lower trimming width, a left trimming width, and a right trimming width) of the respective sides from the trimming widths specified in the above step S3104 (step S3105). Details of calculation processing of the correction parameters in this step will be described later.

Next, the trimming width information generator 406 determines whether there is a side for which a correction parameter has not been calculated in the above step S3105 (step S3106).

In step S3106, if it is determined that there is no side for which a correction parameter has not been calculated, the trimming width information generator 406 associates a paper name with correction parameters to generate trimming width information (step S3107).

Next, the trimming width information generator 406 stores the trimming width information generated in the above step S3107 in the trimming width information storage 420 (step S3108).

Contrarily, if it is determined in step S3105 that there is a side for which a correction parameter has not been calculated, the trimming width information generator 406 terminates the processing. In this case, trimming width information is not generated.

Figure 32:
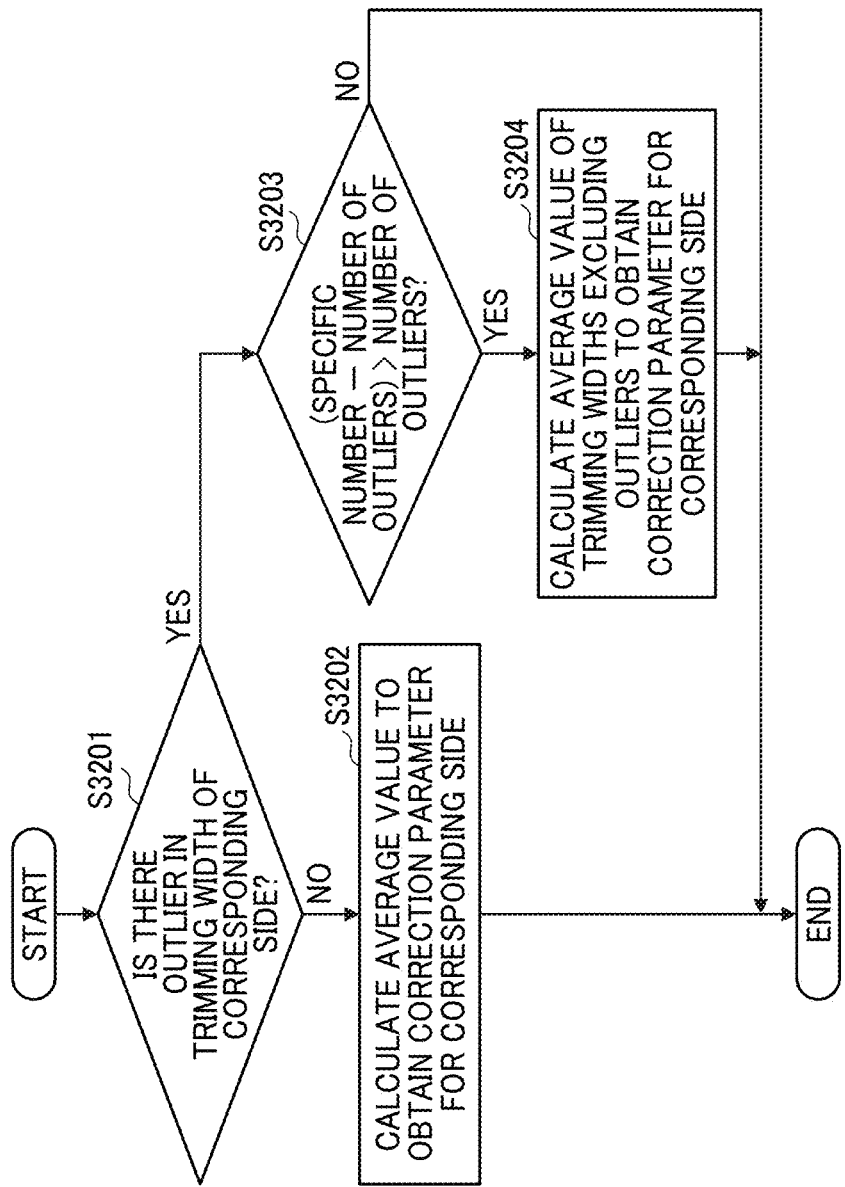
FIG. 32 is a flowchart illustrating an example of calculation processing of the correction parameter according to the second embodiment.

Here, the calculation processing of correction parameters in the above step S3105 will be described with reference to FIG. 32. FIG. 32 is a flowchart illustrating an example of calculation processing of correction parameters according to the present embodiment. Note that processing of steps S3201 to S3205 described below is executed for each of the sides of the read image. That is, the processing of steps S3201 to S3205 is executed for the upper side, the lower side, the left side, and the right side of the read image.

First, the trimming width information generator 406 determines whether there is an outlier in trimming widths specified for a certain side (step S3201).

For example, the trimming width information generator 406 determines whether there is an outlier in the trimming widths tt1, tt2, and tt3 specified for the upper side. Similar determination is performed for other sides.

Whether there is an outlier can be determined by comparing values of the trimming widths and determining whether there is a value that is larger than or equal to a predetermined threshold value th. That is, for example, when none of tt2−tt1>th, tt1−tt3>th, and tt3−tt2>th is satisfied, it is determined that there is no outlier. On the other hand, when at least one of the above is satisfied, it is determined that there is an outlier.

If it is determined that there is no outlier in step S3201, the trimming width information generator 406 calculates an average value of trimming widths specified for the certain side. Then, the trimming width information generator 406 sets the calculated average value as a correction parameter (step S3202).

For example, the trimming width information generator 406 calculates an average value (tt1+tt2+tt3)/3 of the trimming widths tt1, tt2 and tt3 specified for the upper side to set the average value as the upper trimming width. Similar determination is performed for other sides.

Contrarily, if it is determined in step S3201 that there is an outlier, the trimming width information generator 406 determines whether "(the number of specified trimming widths−the number of outliers)>the number of outliers" is satisfied (step S3203). The number of specified trimming widths is the number of trimming widths specified in step S3104 of FIG. 31 for the certain side. The number of outliers is the number of trimming widths that are outliers out of the number of specified trimming widths.

If it is determined in step S3203 that "(the number of specified trimming widths−the number of outliers)>the number of outliers" is satisfied, the trimming width information generator 406 calculates an average value of the trimming widths excluding the outliers. Then, the trimming width information generator 406 uses the calculated average value as a correction parameter (step S3204).

Contrarily, if it is determined in step S3203 that "(the number of specified trimming widths−the number of outliers)>the number of outliers" is not satisfied, the trimming width information generator 406 terminates the processing. In this case, a correction parameter for the certain side is not calculated.

As described above, when "(the number of specified trimming widths−the number of outliers)>the number of outliers" is satisfied for the certain side, the trimming width information generator 406 calculates the correction parameter for that side. In other words, as long as "(the number of specified trimming widths−the number of outliers)>the number of outliers" is satisfied, the trimming width information generator 406 can calculate a correction parameter even when there is an outlier due to adhesion of contamination or other reasons.

<Comparative Example of Robustness>

As described above, by arranging a plurality of trimming width specifying areas for each of the sides of the read image, robustness against adhesion of contamination and the like can be enhanced. In addition to this, the robustness can be enhanced also by widening widths among a plurality of trimming width specifying areas.

Figure 33A:
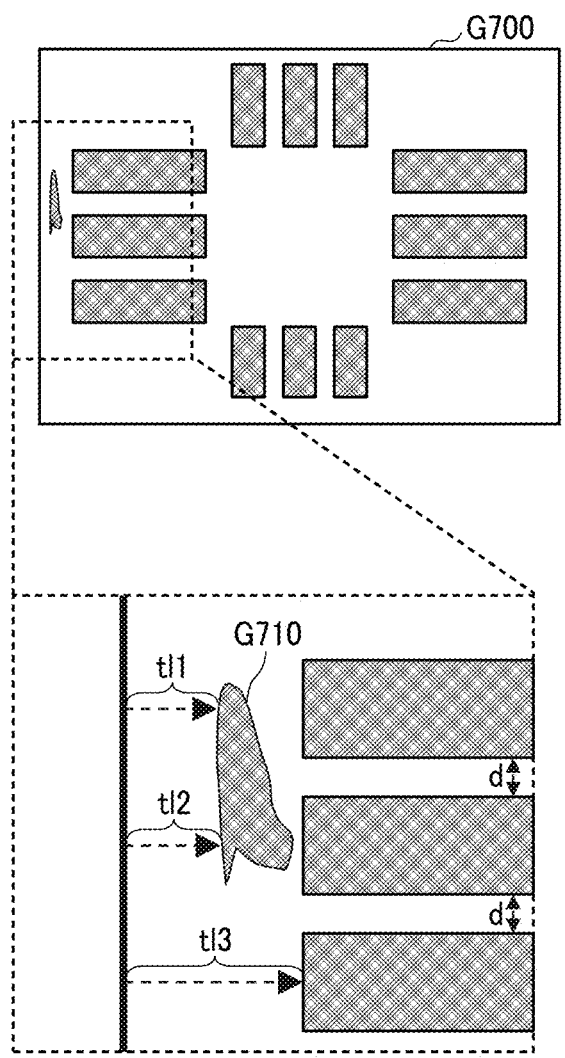
FIGS. 33A and 33B are diagrams for explaining a comparison of robustness in calculation of the correction parameter (trimming width).

For example, as illustrated in FIG. 33A, let us assume that contamination G710 extending over two trimming width specifying areas adheres to a read image G700 in which a width between any two of trimming width specifying areas is d. In this case, the above "(the number of specified trimming widths–the number of outliers)>the number of outliers" is not satisfied. Therefore, a correction parameter indicating the left trimming width cannot be calculated.

Figure 33B:
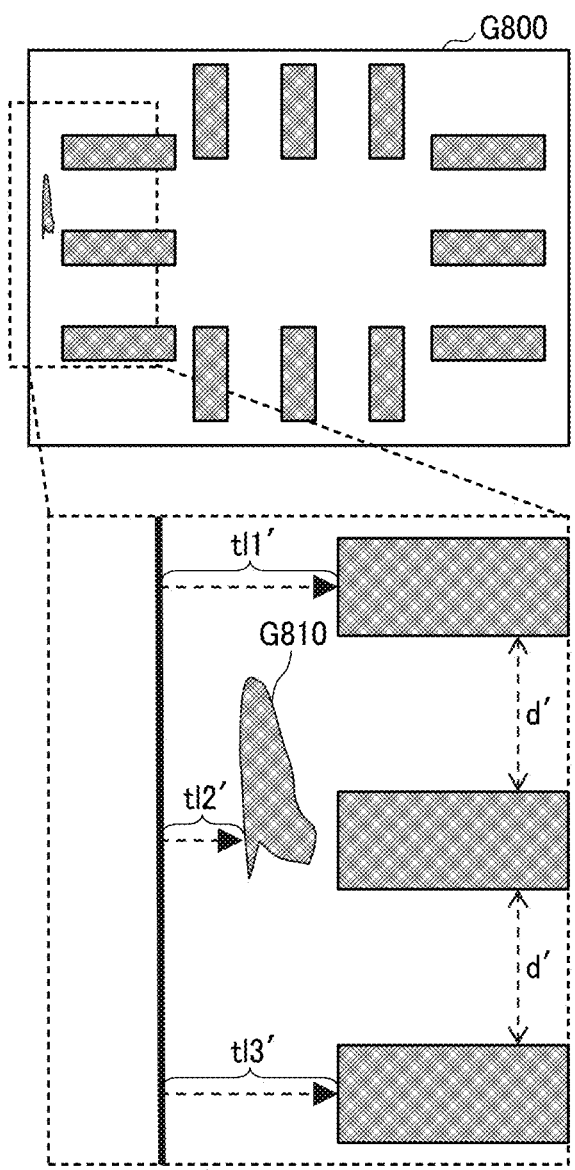

Meanwhile, let us assume that contamination G810 similar to the above adheres to a read image G800 in which a width between any two of trimming width specifying areas is d' (>d) for example, as illustrated in FIG. 33B. In this case, the above "(the number of specified trimming widths–the number of outliers)>the number of outliers" is satisfied. Therefore, a correction parameter indicating the left trimming width can be calculated.

In this manner, by widening a width between any two of a plurality of trimming width specifying areas, a situation where contamination extends over some of the plurality of trimming width specifying areas can be prevented. Thus, the robustness can be enhanced.

Embodiments of the present invention are not limited to the above-described embodiments that are specifically disclosed and may include various variations and modifications without departing from the scope of the claims.

Supplementary Note 1

An image inspection device includes: a first read image generator to reads a recording medium on which a chart image for calculation of a plurality of types of correction parameters is formed and output to generate a first read image; a correction parameter calculator to calculate the plurality of types of correction parameters on basis of the first read image and the chart image; a second read image generator to read a recording medium on which an image to be inspected is formed and output to generate a second read image; a reference image generator to correct the image by using the plurality of types of correction parameters to generate a reference image; and an inspector to compare the reference image and the second read image to inspect the second read image.

Supplementary Note 2

In the image inspection device according to supplementary note 1, the correction parameter calculator calculates the plurality of types of correction parameters according to a type of the recording medium on basis of the first read image and the chart image.

Supplementary Note 3

In the image inspection device according to supplementary note 1 or 2, the chart image includes a plurality of chart elements to separately calculate the plurality of types of correction parameters, and the plurality of chart elements is arranged so as not to mutually affect calculation of the plurality of correction parameters.

Supplementary Note 4

In the image inspection device according to supplementary note 3, the plurality of chart elements includes a first chart element for calculation of a correction parameter for correcting a shape characteristic of the chart image to be same as a shape characteristic of the first read image, a second chart element for calculation of a correction parameter for correcting a color characteristic of the chart image to be same as a color characteristic of the first read image, and a third chart element for calculation of a correction parameter for trimming a same area as an area of the first read image from the chart image.

Supplementary Note 5

In the image inspection device according to any one of supplementary notes 1 to 4, the inspector generates a differential image indicating a difference between the reference image and the second read image and compares each pixel value of the differential image with a threshold value to inspect the second read image.

Supplementary Note 6

An image inspection system includes a first read image generator to read a recording medium on which a chart image for calculation of a plurality of types of correction parameters is formed, to generate a first read image; a correction parameter calculator to calculate the plurality of types of correction parameters on basis of the first read image and the chart image; a second read image generator to read a recording medium on which an image to be inspected is formed, to generate a second read image; a reference image generator to correct the image with the plurality of types of correction parameters to generate a reference image; and an inspector to compare the reference image and the second read image to inspect the second read image.

Supplementary Note 7

An image inspection method includes reading a recording medium on which a chart image for calculation of a plurality of types of correction parameters is formed, to generate a first read image; calculating the plurality of types of correction parameters on basis of the first read image and the chart image; reading a recording medium on which an image to be inspected is formed, to generate a second read image; correcting the image with the plurality of types of correction parameters to generate a reference image; and comparing the reference image and the second read image to inspect the second read image.

Supplementary Note 8

An image inspection device includes a first read image generator to read a recording medium on which a chart image for calculation of a trimming width is formed and output to generate a first read image; a trimming width calculator to calculate a trimming width trimmed in the formation and output of the chart image from the first read image generated by the first read image generator; a second read image generator to read a recording medium on which an image to be inspected is formed and output to generate a second read image; a reference image generator to trim the image using the trimming width calculated by the trimming width calculator to generate a reference image; and an inspector to inspect the second read image generated by the second read image generator through comparison with the reference image generated by the reference image generator.

Supplementary Note 9

In the image inspection device according to supplementary note 8, chart elements for separate calculation of a trimming width in an upper part, a trimming width in a lower part, a trimming width in a left part, and a trimming width in a right part of the chart image to be trimmed in the image formation output are arranged in the chart image.

Supplementary Note 10

In the image inspection device according to supplementary note 8 or 9, the trimming width calculator searches a change in a pixel value from each of the sides of the first read image to one of the chart elements to calculate the trimming widths.

Supplementary Note 11

In the image inspection device according to supplementary note 9, a plurality of chart elements for calculation of each of the trimming width in the upper part, the trimming width in the lower part, the trimming width in the left part, and the trimming width in the right part is arranged in the chart image.

Supplementary Note 12

In the image inspection device according to supplementary note 11, the trimming width calculator searches a change in a pixel value from each of the sides of the first read image to one of the plurality of chart elements to calculate a width from the side to the chart element for each of the plurality of chart elements and calculates an average of the calculated widths to calculate each of the trimming widths.

Supplementary Note 13

In the image inspection device according to supplementary note 12, the trimming width calculator searches a change in a pixel value from each of the sides of the first read image to one of the plurality of chart elements to calculate a width from the side to the chart element for each of the plurality of chart elements and calculates an average of the calculated widths excluding a width which is an outlier to calculate each of the trimming widths.

Supplementary Note 14

An image inspection method causes a computer to execute a first read image generating step of reading a recording medium on which a chart image for calculation of a trimming width is formed and output to generate a first read image; a trimming width calculation step of calculating a trimming width trimmed in the formation and output of the chart image from the first read image generated in the first read image generation step; a second read image generating step of reading a recording medium on which an image to be inspected is formed and output to generate a second read image; a reference image generating step of trimming the image using the trimming width calculated in the trimming width calculating step to generate a reference image; and an inspection step of inspecting the second read image generated in the second read image generation step through comparison with the reference image generated in the reference image generation step.

Supplementary Note 15

An image inspection system includes a first read image generator to read a recording medium on which a chart image for calculation of a trimming width is formed and output to generate a first read image; a trimming width calculator to calculate a trimming width trimmed in the formation and output of the chart image from the first read image generated by the first read image generator; a second read image generator to read a recording medium on which an image to be inspected is formed and output to generate a second read image; a reference image generator to trim the image using the trimming width calculated by the trimming width calculator to generate a reference image; and an inspector to inspect the second read image generated by the second read image generator through comparison with the reference image generated by the reference image generator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image inspection device comprising:
   a reading device configured to:
      read a chart image formed on a first recording medium to generate a first read image, the chart image formed on the first recording medium including a plurality of chart elements associated with respective ones of a plurality of types of correction parameters, a first chart element of the plurality of chart elements associated with a first correction parameter of the plurality of types of correction parameters for correcting a shape characteristic of image data to be formed on a second recording medium, and
      read an image formed on the second recording medium to generate a second read image; and
   a processor configured to:
      calculate the plurality of types of correction parameters based on the first read image and image data of the plurality of chart elements of the chart image,
      correct the image data to be formed on the second recording medium with the plurality of types of correction parameters to generate a reference image, and
      compare the reference image and the second read image to inspect the second read image.

2. The image inspection device according to claim 1, wherein the processor is configured to calculate the plurality of types of correction parameters according to a type of the second recording medium based on the first read image and the image data of the chart image.

3. The image inspection device according to claim 1, wherein the plurality of types of chart elements is arranged so as not to mutually affect calculation of the plurality of types of correction parameters.

4. The image inspection device according to claim 3, wherein the plurality of types of chart elements further includes,
   a second chart element for calculation of a second correction parameter of the plurality of types of correction parameters for correcting a color characteristic of the image data, and
   a third chart element for calculation of a third correction parameter of the plurality of types of correction parameters for trimming a same area as an area of the first read image from the chart image.

5. The image inspection device according to claim 1, wherein the processor is configured to,
   generate a differential image indicating a difference between the reference image and the second read image, and
   compare each pixel value of the differential image with a threshold value to inspect the second read image.

6. The image inspection apparatus of claim 1, wherein the processor is configured to correct at least the shape characteristic of the image data based on the first correction parameter.

7. An image inspection system comprising:
a reading device configured to:
- read a chart image formed on a first recording medium to generate a first read image, the chart image formed on the first recording medium including a plurality of chart elements associated with respective ones of a plurality of types of correction parameters, a first chart element of the plurality of chart elements associated with a first correction parameter of the plurality of types of correction parameters for correcting a shape characteristic of image data to be formed on the second recording medium, and
- read an image formed on the second recording medium to generate a second read image; and a processor configured to:
- calculate the plurality of types of correction parameters based on the first read image and image data of the plurality of chart elements of the chart image,
- correct the image data to be formed on the second recording medium with the plurality of types of correction parameters to generate a reference image, and
- compare the reference image and the second read image to inspect the second read image.

8. The image inspection system according to claim 7, wherein the plurality of types of chart elements further includes,
- a second chart element for calculation of a second correction parameter of the plurality of types of correction parameters for correcting a color characteristic of the image data, and
- a third chart element for calculation of a third correction parameter of the plurality of types of correction parameters for trimming a same area as an area of the first read image from the chart image.

9. The image inspection system of claim 7, wherein the processor is configured to correct at least the shape characteristic of the image data based on the first correction parameter.

10. An image inspection method comprising:
- reading a chart image formed on a first recording medium to generate a first read image, the chart image formed on the first recording medium including a plurality of chart elements associated with respective ones of a plurality of types of correction parameters, a first chart element of the plurality of chart elements associated with a first correction parameter of the plurality of types of correction parameters for correcting a shape characteristic of image data to be formed on a second recording medium;
- calculating the plurality of types of correction parameters based on the first read image and image data of the plurality of chart elements of the chart image;
- reading an image formed on the second recording medium to generate a second read image;
- correcting the image data to be formed on the second recording medium with the plurality of types of correction parameters to generate a reference image such that the correcting corrects at least the shape characteristic of the image data based on the first correction parameter; and
- comparing the reference image and the second read image to inspect the second read image.

11. The image inspection method according to claim 10, wherein the plurality of types of chart elements further includes,
- a second chart element for calculation of a second correction parameter of the plurality of types of correction parameters for correcting a color characteristic of the image data, and
- a third chart element for calculation of a third correction parameter of the plurality of types of correction parameters for trimming a same area as an area of the first read image from the chart image.

12. The image inspection method of claim 10, wherein the correcting corrects at least the shape characteristic of the image data based on the first correction parameter.

* * * * *